US011563825B2

(12) United States Patent
Shortt et al.

(10) Patent No.: US 11,563,825 B2
(45) Date of Patent: Jan. 24, 2023

(54) GROUP-BASED COMMUNICATION APPARATUS, METHOD, AND COMPUTER PROGRAM PRODUCT CONFIGURED TO MANAGE DRAFT MESSAGES IN A GROUP-BASED COMMUNICATION SYSTEM

(71) Applicant: Salesforce.com., Inc., San Francisco, CA (US)

(72) Inventors: Madeline Shortt, San Francisco, CA (US); Ryan Greenberg, Montclair, NJ (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/706,405

(22) Filed: Mar. 28, 2022

(65) Prior Publication Data

US 2022/0286529 A1    Sep. 8, 2022

Related U.S. Application Data

(63) Continuation of application No. 16/588,646, filed on Sep. 30, 2019, now Pat. No. 11,290,560.

(51) Int. Cl.
*H04L 67/5683* (2022.01)
*H04L 51/216* (2022.01)
(Continued)

(52) U.S. Cl.
CPC ...... *H04L 67/5683* (2022.05); *H04L 12/1813* (2013.01); *H04L 51/04* (2013.01); *H04L 51/216* (2022.05)

(58) Field of Classification Search
CPC .............. H04L 12/1818; H04L 1/1813; H04L 67/2857; H04L 51/04; H04L 51/16; H04L 67/327
See application file for complete search history.

(56) References Cited

U.S. PATENT DOCUMENTS 8,319,816 B1 * 11/2012 Swanson ............. H04L 12/1818
370/352
8,605,132 B1 * 12/2013 Swanson ................ H04N 7/155
370/260
(Continued)

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Shean Tokuta
(74) *Attorney, Agent, or Firm* — Lee & Hayes, P.C.

(57) ABSTRACT

Various embodiments are directed to an improved group-based communication apparatus that is configured to efficiently manage draft messaging communications in a group-based communication system. The group-based communication apparatus is configured to synchronize draft messaging communications, including creating, updating, deleting, and posting of such draft messaging communications, across multiple client devices and with a group-based communication repository. Utilizing draft message metadata associated with the draft messaging communications, the group-based communication apparatus is also configured to implement validation rules and conflict resolution procedures associated with draft messaging communications. Additionally, the group-based communication apparatus is configured to render a draft list icon or other visual indicia to a group-based communication interface to inform a user that there is a draft messaging communication associated with one or more of the group-based communication channels.

20 Claims, 9 Drawing Sheets

(51) Int. Cl.
*H04L 12/18* (2006.01)
*H04L 51/04* (2022.01)

(56) References Cited

U.S. PATENT DOCUMENTS

| | | | | |
|---|---|---|---|---|
| 8,897,177 | B2* | 11/2014 | Arora | H04M 3/563 |
| | | | | 370/352 |
| 9,380,264 | B1* | 6/2016 | Vakalapudi | H04N 7/147 |
| 9,426,182 | B1* | 8/2016 | Zeljko | H04L 63/08 |
| 9,467,542 | B1* | 10/2016 | Messenger | H04M 3/42051 |
| 9,686,323 | B1* | 6/2017 | Helter | H04L 65/1096 |
| 10,440,327 | B1* | 10/2019 | Bytyqi | H04N 5/23293 |
| 10,572,859 | B1* | 2/2020 | Evans | H04M 3/42068 |
| 10,652,286 | B1* | 5/2020 | George | H04L 67/55 |
| 10,742,649 | B1* | 8/2020 | Hook, Jr. | H04L 63/0272 |
| 11,290,560 | B2* | 3/2022 | Shortt | H04L 12/1813 |
| 2002/0091991 | A1 | 7/2002 | Castro | |
| 2005/0193067 | A1* | 9/2005 | Ferguson | G06Q 10/107 |
| | | | | 709/217 |
| 2010/0174816 | A1* | 7/2010 | Piccinini | H04L 12/2859 |
| | | | | 709/227 |
| 2013/0162753 | A1* | 6/2013 | Hendrickson | H04N 7/15 |
| | | | | 348/E7.083 |
| 2013/0254830 | A1* | 9/2013 | Moganti | H04L 63/08 |
| | | | | 726/1 |
| 2014/0139609 | A1* | 5/2014 | Lu | G06T 11/60 |
| | | | | 348/14.03 |
| 2014/0195626 | A1* | 7/2014 | Ruff | H04W 12/086 |
| | | | | 709/206 |
| 2014/0344420 | A1* | 11/2014 | Rjeili | G06Q 10/109 |
| | | | | 709/227 |
| 2015/0230274 | A1* | 8/2015 | Sharma | H04W 76/12 |
| | | | | 370/329 |
| 2015/0271233 | A1 | 9/2015 | Bouazizi | |
| 2015/0381594 | A1* | 12/2015 | Venkatesan | G06F 16/955 |
| | | | | 726/6 |
| 2016/0050177 | A1* | 2/2016 | Cue | H04L 51/234 |
| | | | | 709/206 |
| 2016/0094562 | A1* | 3/2016 | Li | H04L 63/105 |
| | | | | 726/28 |
| 2016/0105859 | A1 | 4/2016 | Zhu | |
| 2016/0182412 | A1* | 6/2016 | Kabbes | H04L 51/42 |
| | | | | 709/206 |
| 2016/0275303 | A1 | 9/2016 | Narayanaswamy et al. | |
| 2016/0344679 | A1 | 11/2016 | Lane et al. | |
| 2017/0046134 | A1* | 2/2017 | Straub | G06F 8/34 |
| 2017/0171200 | A1* | 6/2017 | Bao | H04L 9/3213 |
| 2018/0005500 | A1* | 1/2018 | Robertson | H04N 7/181 |
| 2018/0054720 | A1* | 2/2018 | Messenger | H04W 68/005 |
| 2018/0137470 | A1* | 5/2018 | Donnelly | H04W 4/44 |
| 2018/0212903 | A1 | 7/2018 | Rose et al. | |
| 2018/0217848 | A1* | 8/2018 | Garai | G06F 9/451 |
| 2018/0247077 | A1* | 8/2018 | Barrett-Bowen | H04L 63/102 |
| 2018/0287982 | A1 | 10/2018 | Draeger et al. | |
| 2019/0068372 | A1* | 2/2019 | Bhatnagar | H04L 9/0841 |
| 2019/0082143 | A1* | 3/2019 | Ren | H04N 21/4316 |
| 2019/0139002 | A1* | 5/2019 | Kumar | G06Q 10/1095 |
| 2019/0200177 | A1 | 6/2019 | Greene et al. | |
| 2019/0244613 | A1* | 8/2019 | Jonas | H04M 7/006 |
| 2020/0008029 | A1* | 1/2020 | Cao | H04W 76/10 |
| 2020/0097334 | A1 | 3/2020 | Oliveros et al. | |
| 2021/0044634 | A1* | 2/2021 | Hughes | H04L 65/403 |
| 2021/0099539 | A1* | 4/2021 | Shortt | H04L 67/5683 |
| 2021/0173493 | A1* | 6/2021 | Barzilay | G06F 3/0482 |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield On How Slack Became A $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019], Retrieved from the Internet: <URL: https://en.wikipedia.org/wiki/Internet_Relay_Chat> (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516> (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36,2, (Dec. 2000) pp. 154-161.

Office Action for U.S. Appl. No. 16/588,646, dated Feb. 19, 2021, Shorttt, "Group-Based Communication Apparatus, Method, And Computer Program Product Configured To Manage Draft Messages In A Group-Based Communication System", 15 Pages.

Office Action for U.S. Appl. No. 16/588,646, dated Oct. 2, 2020, Shortt, "Group-Based Communication Apparatus, Method, And Computer Program Product Configured To Manage Draft Messages In A Group-Based Communication System", 15 Pages.

Office Action for U.S. Appl. No. 16/588,646, dated Jul. 8, 2021, Shortt, "Group-Based Communication Apparatus, Method, And Computer Program Product Configured To Manage Draft Messages In A Group-Based Communication System" 15 pages.

Oikarinen, J. & Reed, D., "Internet Relay Chat Protocol", Request for Comments: 1459, Network Working Group, [online][retrieved May 30, 2019], Retrieved from the Internet: <URL: https://www.rfc-editor.org/rfc/rfc1459.txt>. (dated May 1993) 57 pages.

Ernie Smith, "Picking Up The Slack", Tedium, [online][retrieved May 9, 2019]. Retrieved from the Internet: <URL https://tedium.co/2017/10/17/irc-vs-slack-chat-history/> (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

\* cited by examiner

PDE
○ Jonathan Barrows ⊞
Drafts
⌘ Masonry - design - Anderson Proj.

🔍 All Channels                                    ⊕ ▾

Construction - build - Anderson Proj.
Construction - permit - Anderson Proj.
Construction - QA - Anderson Proj.
Construction - site plan - Anderson Proj.
Design - drafting - Anderson Proj.
Design - drafting - Simpson Proj.
Design - feasability - Anderson Proj.
Design - feasability - Simpson Proj.
Design - planning - Anderson Proj.
Design - planning - Simpson Proj.
Electrical - design - Anderson Proj.
Electrical - design - Simpson Proj.
Electrical - fabricate - Anderson Proj.
Electrical - fabricate - Simpson Proj.
HR - compliance
HR - offboarding
HR - onboarding
HR - payroll
HR - personnel reviews
HR - policy
IT - Network design
Masonry - build - Anderson Proj.
Masonry - build - Simpson Proj.
Masonry - design - Anderson Proj.
Masonry - design - Simpson Proj.
Procurement - Anderson Proj.
Procurement - Simpson Proj.

— 405

Masonry - design - Anderson Proj.
☆ ¡ & 1&2 | & - [T-shaped foundation for new roof]     🔍 Search
                                                    ( Today )

🔍 Kevin Flannery - 3:19 PM
Here is the draft elevation for the Anderson project.

[drawing of house elevation]

🔍 Jacob Warren - 3:20 PM
Did you consider Florida Hurricane Specifications for the roof supports?

🔍 Kevin Flannery - 3:21 PM
Not yet - will send an updated draft shortly.

⊕ Enter Message Text                              @ ☺

GROUP-BASED COMMUNICATION APPARATUS, METHOD, AND COMPUTER PROGRAM PRODUCT CONFIGURED TO MANAGE DRAFT MESSAGES IN A GROUP-BASED COMMUNICATION SYSTEM

RELATED APPLICATIONS

This Application claims priority to U.S. patent application Ser. No. 16/588,646, filed Sep. 30, 2019, and granted as U.S. Pat. No. 11,290,560, on Mar. 29, 2022, which is incorporated herein by reference.

BACKGROUND

Systems have been provided for managing draft messaging communications among a plurality of client devices connected with a centralized messaging system. Applicant has identified a number of deficiencies and problems associated with conventional messaging systems. Through applied effort, ingenuity, and innovation, these deficiencies and problems have been solved by developing solutions that are structured in accordance with the embodiments of the present invention, many examples of which are described in detail herein.

BRIEF SUMMARY

Various embodiments provided herein disclose improved group-based communication apparatuses, methods, and computer program products configured to efficiently manage draft messages associated with a group-based communication system.

One embodiment is directed to a group-based communication apparatus configured to manage draft messaging communications of a group-based communication system, the group-based communication apparatus comprising at least one processor and at least one memory, the at least one memory having computer-coded instructions therein, wherein the computer-coded instructions are configured to, in execution with the at least one processor, cause the group-based communication apparatus to receive, from a first client device associated with a user identifier, a create draft message request associated with a first draft messaging communication, wherein the first draft messaging communication comprises first draft message metadata; cause storage of the first draft messaging communication in a group-based communication repository; and propagate the first draft messaging communication to all client devices associated with the user identifier.

In one embodiment, the group-based communication apparatus further comprises a draft message application programming interface, wherein the create draft message request is received via the draft message application programming interface.

In another embodiment, the first draft message metadata comprises a group identifier. In some embodiments, the computer-coded instructions are configured to cause the group-based communication apparatus to propagate the first draft messaging communication to all client devices associated with each of the user identifier and the group identifier. In still other embodiments, the first draft message metadata comprises a draft identifier.

In some embodiments, causing storage of the first draft messaging communication in the group-based communication repository comprises assigning a draft identifier to the first draft messaging communication; and storing the draft identifier in association with the first draft messaging communication in the group-based communication repository. In still further embodiments, propagating the first draft messaging communication to all client devices associated with the user identifier comprises transmitting the first draft messaging communication and the draft identifier to all client devices associated with the user identifier. In other embodiments, causing storage of the first draft messaging communication in the group-based communication repository comprises assigning a draft identifier and a first version identifier to the first draft messaging communication; and storing the draft identifier and the first version identifier in association with the first draft messaging communication in the group-based communication repository. In still further embodiments, propagating the first draft messaging communication to all client devices associated with the user identifier comprises transmitting the first draft messaging communication, the draft identifier, and the first version identifier to all client devices associated with the user identifier. In another embodiment, the first version identifier comprises a last updated timestamp.

In another embodiment, the computer-coded instructions are configured to cause the group-based communication apparatus to receive, from a second client device associated with the user identifier, an update draft message request associated with a second draft messaging communication, wherein the second draft messaging communication comprises second draft message metadata, the second draft message metadata comprising the user identifier; determine whether the second draft messaging communication satisfies update draft message validation rules; and in an instance where the second draft messaging communication satisfies the update draft message validation rules, propagate the second draft messaging communication to all client devices associated with the user identifier, and cause storage of the second draft messaging communication in the group-based communication repository. In one embodiment, the group-based communication apparatus further comprises a draft message application programming interface, wherein the update draft message request is received via the draft message application programming interface.

In one embodiment, the update draft message validation rules comprise determining whether a first parameter associated with the first draft message metadata is equal to a second parameter associated with the second draft message metadata. In another embodiment, the second draft message metadata further comprises a draft identifier, the second draft messaging communication satisfying the update draft message validation rules upon return of at least one draft messaging communication associated with the draft identifier in response to a query of the group-based communication repository for the draft identifier. In still further embodiments, the first draft message metadata stored in association with the first draft messaging communication in the group-based communication repository comprises a first draft identifier and a first version identifier, the second draft messaging communication comprises a second draft identifier and a second version identifier, and the second draft messaging communication satisfies the update draft message validation rules when the processor determines that the first and second draft identifiers are equal to each other and that the first and second version identifiers are equal to each other. In some embodiments, the first and second version identifiers are indicative of when the first and second draft messaging communications were last updated.

In one embodiment, causing storage of the second draft messaging communication in the group-based repository comprises overwriting the first draft messaging communication in the group-based communication repository. In another embodiment, causing storage of the second draft messaging communication in the group-based repository comprises assigning a second version identifier to the second draft messaging communication; and storing the second version identifier in association with the second draft messaging communication in the group-based communication repository. In still further embodiments, the second version identifier comprises a last updated timestamp.

In another embodiment, the computer-coded instructions are configured to cause the group-based communication apparatus to in an instance where the second draft messaging communication fails to satisfy the update draft message validation rules, initiate a draft message conflict resolution procedure. In one embodiment, the second draft message metadata further comprises a draft identifier, the second draft messaging communication failing to satisfy the update draft message validation rules when the group-based communication repository fails to return at least one draft messaging communication associated with the draft identifier in response to a query of the group-based communication repository for the draft identifier. In another embodiment, the first draft message metadata stored in association with the first draft messaging communication in the group-based communication repository comprises a first draft identifier and a first version identifier, the second draft message metadata further comprises a second draft identifier and a second version identifier, and the second draft messaging communication fails to satisfy the update draft message validation rules when the processor determines that the first and second draft identifiers are equal to each other and the first and second version identifiers differ from each other. In still further embodiments, the first and second version identifiers are indicative of when the first and second draft messaging communications were last updated.

In still other embodiments, initiating a draft message conflict resolution procedure comprises storing the second draft messaging communication in the group-based communication repository. In another embodiment, initiating a draft message conflict resolution procedure comprises overwriting the first draft messaging communication in the group-based communication repository with the second draft messaging communication. In still other embodiments, initiating a draft message conflict resolution procedure comprises transmitting an error event to the second client device. In another embodiment, initiating a draft message conflict resolution procedure comprises programmatically generating a proposed draft messaging communication, wherein the proposed draft messaging communication comprises a first body content data associated with the first draft messaging communication, a second body content data associated with the second draft messaging communication, and an indication of one or more differences between the first and second body content data.

In one embodiment, the first draft message metadata comprises a channel identifier, and wherein the computer-coded instructions are configured to cause the group-based communication apparatus to propagate the first draft messaging communication to all client devices associated with each of the user identifier and the channel identifier. In another embodiment, the second draft message metadata comprises a channel identifier, and wherein the computer-coded instructions are further configured to cause the group-based communication apparatus to propagate the second draft messaging communication to all client devices associated with each of the user identifier and the channel identifier.

In another embodiment, the computer-coded instructions are configured to cause the group-based communication apparatus to receive a delete draft message request associated with a draft identifier; query the group-based communication repository for all draft messaging communications associated with the draft identifier; delete all draft messaging communications associated with the draft identifier stored in the group-based communication repository returned by the query; and propagate a delete draft message event associated with the draft identifier to all client devices associated with the user identifier.

In one embodiment, the group-based communication apparatus further comprises a draft message application programming interface, wherein the delete draft message request is received via the draft message application programming interface.

In another embodiment, the first draft message metadata comprises a draft identifier and a group identifier, and the computer-coded instructions are further configured to cause the group-based communication apparatus to receive a post message request associated with the draft identifier and a channel identifier associated with a group-based communication channel of a group-based communication interface associated with the group identifier; generate a messaging communication based on the first draft messaging communication in response to receipt of the post message request; cause rendering of the messaging communication to the group-based communication channel of the group-based communication interface; delete all draft messaging communications associated with the draft identifier stored in the group-based communication repository; and propagate a delete draft message event associated with the draft identifier to all client devices associated with the user identifier.

In another embodiment, the second draft message metadata comprises a draft identifier and a group identifier, and the computer-coded instructions are further configured to cause the group-based communication apparatus to receive a post message request associated with the draft identifier and a channel identifier associated with a group-based communication channel of a group-based communication interface associated with the group identifier; generate a messaging communication based on the second draft messaging communication in response to receipt of the post message request; cause rendering of the messaging communication to the group-based communication channel of the group-based communication interface; delete all draft messaging communications associated with the draft identifier stored in the group-based communication repository; and propagate a delete draft message event associated with the draft identifier to all client devices associated with the user identifier.

In one embodiment, the group-based communication apparatus further comprises a message application programming interface, wherein the post message request is received via the message application programming interface. In another embodiment, the group-based communication apparatus further comprises a draft message application programming interface, wherein the create draft message request is received via the draft message application programming interface. In still further embodiments, the create draft message request and the update draft message request are received via the draft message application programming interface.

In another embodiment, the first draft message metadata comprises at least one of a thread identifier and a thread timestamp.

Still other embodiments are directed to a group-based communication apparatus configured to manage draft messaging communications of a group-based communication system, the group-based communication apparatus comprising at least one processor and at least one memory, the at least one memory having computer-coded instructions therein, wherein the computer-coded instructions are configured to, in execution with the at least one processor, cause the group-based communication apparatus to receive a user identifier and a group identifier; access a plurality of group-based communication channel identifiers based on the user identifier and the group identifier; cause rendering of a group-based communication channel list to a channel list pane of a group-based communication interface based on the group-based communication channel identifiers; query a group-based communication repository for all draft messaging communications associated with both the user identifier and the group identifier; and in a circumstance where the query of the group-based communication repository returns at least one draft messaging communication, cause rendering to the channel list pane of a draft list icon. In another embodiment, the draft list icon is a pencil icon.

Still other embodiments are directed to a group-based communication apparatus configured to manage draft messaging communications of a group-based communication system, the group-based communication apparatus comprising at least one processor and at least one memory, the at least one memory having computer-coded instructions therein, wherein the computer-coded instructions are configured to, in execution with the at least one processor, cause the group-based communication apparatus to receive, from a client device, a draft sync request associated with a user identifier and a group identifier; query a group-based communication repository for all draft messaging communications associated with each of the user identifier and the group identifier, wherein each draft messaging communication comprises draft message metadata; and transmit all draft messaging communications returned by the query to the client device. In another embodiment, the group-based communication apparatus further comprises a draft message application programming interface, wherein the draft sync request is received via the draft message application programming interface. In another embodiment, the draft sync request is associated with the user identifier, the group identifier, and a client last updated timestamp and querying the group-based communication repository comprises querying the group-based communication repository for all draft messaging communications associated with each of the user identifier and the group identifier that have a last updated timestamp subsequent to the client last updated timestamp.

Still other embodiments are directed to a client device comprising at least one processor configured to monitor user interactions with a group-based communication interface; detect one or more create draft message trigger events; upon detection of a create draft message trigger event, generate a create draft message request, wherein the create draft message request comprises a first draft messaging communication, the first draft messaging communication comprising first draft message metadata; and transmit the create draft message request comprising the first draft messaging communication to a group-based communication system. In one embodiment, the create draft message trigger event is detecting user input in a draft message interface component rendered on the first client device, a first draft body content data comprising the detected user input. In another embodiment, the create draft message trigger event is detecting that a draft message interface inactivity threshold has been satisfied. In still another embodiment, the create draft message trigger event is detecting that a draft message interface component is unfocused. In another embodiment, generating a create draft message request comprises assigning a draft identifier to the first draft messaging communication, and wherein the first draft message metadata further comprises the draft identifier.

In one embodiment, the at least one processor of the client device is further configured to detect one or more update draft message trigger events; upon detection of an update draft message trigger event, generate an update draft message request, wherein the update draft message request comprises a second draft messaging communication, the second draft messaging communication comprising second draft message metadata; cause local storage of the second draft messaging communication in the memory; and transmit the update draft message request comprising the second draft messaging communication to the group-based communication system. In one embodiment, the update draft message trigger event is detecting user input in a draft message interface component rendered on the client device, a second draft body content data comprising the detected user input.

In another embodiment, the client device further comprises at least one memory for maintaining local storage of one or more draft messaging communications and wherein the at least one processor is further configured to cause local storage of the first draft messaging communication in the at least one memory.

One embodiment is directed to a computer-implemented method for managing draft messaging communications of a group-based communication system, the computer-implemented method comprising receiving, from a first client device associated with a user identifier, a create draft message request associated with a first draft messaging communication, wherein the first draft messaging communication comprises first draft message metadata; causing storage of the first draft messaging communication in a group-based communication repository; and propagating the first draft messaging communication to all client devices associated with the user identifier. In another embodiment, the create draft message request is received via a draft message application programming interface.

In one embodiment, the first draft message metadata comprises a group identifier. In some embodiments, the computer-implemented method further comprises propagating the first draft messaging communication to all client devices associated with each of the user identifier and the group identifier. In still other embodiments, the first draft message metadata comprises a draft identifier.

In some embodiments, causing storage of the first draft messaging communication in the group-based communication repository comprises assigning a draft identifier to the first draft messaging communication; and storing the draft identifier in association with the first draft messaging communication in the group-based communication repository. In still further embodiments, propagating the first draft messaging communication to all client devices associated with the user identifier comprises transmitting the first draft messaging communication and the draft identifier to all client devices associated with the user identifier. In other embodiments, causing storage of the first draft messaging communication in the group-based communication repository comprises assigning a draft identifier and a first version identifier to the first draft messaging communication; and storing the draft identifier and the first version identifier in association with the first draft messaging communication in the group-based communication repository. In still further embodiments, propagating the first draft messaging communication to all client devices associated with the user identifier comprises transmitting the first draft messaging communication, the draft identifier, and the first version identifier to all client devices associated with the user identifier. In another embodiment, the first version identifier comprises a last updated timestamp.

In another embodiment, the computer-implemented method further comprises receiving, from a second client device associated with the user identifier, an update draft message request associated with a second draft messaging communication, wherein the second draft messaging communication comprises second draft message metadata, the second draft message metadata comprising the user identifier; determining whether the second draft messaging communication satisfies update draft message validation rules; and in an instance where the second draft messaging communication satisfies the update draft message validation rules, propagating the second draft messaging communication to all client devices associated with the user identifier, and causing storage of the second draft messaging communication in the group-based communication repository. In one embodiment, the update draft message request is received via a draft message application programming interface.

In one embodiment, the update draft message validation rules comprise determining whether a first parameter associated with the first draft message metadata is equal to a second parameter associated with the second draft message metadata. In another embodiment, the second draft message metadata further comprises a draft identifier, the second draft messaging communication satisfying the update draft message validation rules upon return of at least one draft messaging communication associated with the draft identifier in response to a query of the group-based communication repository for the draft identifier. In still further embodiments, the first draft message metadata stored in association with the first draft messaging communication in the group-based communication repository comprises a first draft identifier and a first version identifier, the second draft messaging communication comprises a second draft identifier and a second version identifier, and the second draft messaging communication satisfies the update draft message validation rules when the processor determines that the first and second draft identifiers are equal to each other and that the first and second version identifiers are equal to each other. In some embodiments, the first and second version identifiers are indicative of when the first and second draft messaging communications were last updated.

In one embodiment, causing storage of the second draft messaging communication in the group-based repository comprises overwriting the first draft messaging communication in the group-based communication repository. In another embodiment, causing storage of the second draft messaging communication in the group-based repository comprises assigning a second version identifier to the second draft messaging communication; and storing the second version identifier in association with the second draft messaging communication in the group-based communication repository. In still further embodiments, the second version identifier comprises a last updated timestamp.

In another embodiment, the computer-implemented method further comprises, in an instance where the second draft messaging communication fails to satisfy the update draft message validation rules, initiating a draft message conflict resolution procedure. In one embodiment, the second draft message metadata further comprises a draft identifier, the second draft messaging communication failing to satisfy the update draft message validation rules when the group-based communication repository fails to return at least one draft messaging communication associated with the draft identifier in response to a query of the group-based communication repository for the draft identifier. In another embodiment, the first draft message metadata stored in association with the first draft messaging communication in the group-based communication repository comprises a first draft identifier and a first version identifier, the second draft message metadata further comprises a second draft identifier and a second version identifier, and the second draft messaging communication fails to satisfy the update draft message validation rules when the processor determines that the first and second draft identifiers are equal to each other and the first and second version identifiers differ from each other. In still further embodiments, the first and second version identifiers are indicative of when the first and second draft messaging communications were last updated.

In still other embodiments, initiating a draft message conflict resolution procedure comprises storing the second draft messaging communication in the group-based communication repository. In another embodiment, initiating a draft message conflict resolution procedure comprises overwriting the first draft messaging communication in the group-based communication repository with the second draft messaging communication. In still other embodiments, initiating a draft message conflict resolution procedure comprises transmitting an error event to the second client device. In another embodiment, initiating a draft message conflict resolution procedure comprises programmatically generating a proposed draft messaging communication, wherein the proposed draft messaging communication comprises a first body content data associated with the first draft messaging communication, a second body content data associated with the second draft messaging communication, and an indication of one or more differences between the first and second body content data.

In one embodiment, the first draft message metadata comprises a channel identifier and the computer-implemented method further comprises propagating the first draft messaging communication to all client devices associated with each of the user identifier and the channel identifier. In another embodiment, the second draft message metadata comprises a channel identifier, and the computer-implemented method further comprises propagating the second draft messaging communication to all client devices associated with each of the user identifier and the channel identifier.

In another embodiment, the computer-implemented method further comprises receiving a delete draft message request associated with a draft identifier; querying the group-based communication repository for all draft messaging communications associated with the draft identifier; deleting all draft messaging communications associated with the draft identifier stored in the group-based communication repository returned by the query; and propagating a delete draft message event associated with the draft identifier to all client devices associated with the user identifier. In one embodiment, the delete draft message request is received via a draft message application programming interface.

In another embodiment, the first draft message metadata comprises a draft identifier and a group identifier, and the computer-implemented method further comprises receiving a post message request associated with the draft identifier and a channel identifier associated with a group-based communication channel of a group-based communication interface associated with the group identifier; generating a messaging communication based on the first draft messaging communication in response to receipt of the post message request; causing rendering of the messaging communication to the group-based communication channel of the group-based communication interface; deleting all draft messaging communications associated with the draft identifier stored in the group-based communication repository; and propagating a delete draft message event associated with the draft identifier to all client devices associated with the user identifier.

In another embodiment, the second draft message metadata comprises a draft identifier and a group identifier, and the computer-implemented method further comprises receiving a post message request associated with the draft identifier and a channel identifier associated with a group-based communication channel of a group-based communication interface associated with the group identifier; generating a messaging communication based on the second draft messaging communication in response to receipt of the post message request; causing rendering of the messaging communication to the group-based communication channel of the group-based communication interface; deleting all draft messaging communications associated with the draft identifier stored in the group-based communication repository; and propagating a delete draft message event associated with the draft identifier to all client devices associated with the user identifier.

In one embodiment, the post message request is received via the message application programming interface. In another embodiment, the create draft message request is received via the draft message application programming interface. In still further embodiments, the create draft message request and the update draft message request are received via the draft message application programming interface.

In another embodiment, the first draft message metadata comprises at least one of a thread identifier and a thread timestamp.

Still other embodiments are directed to a computer-implemented method for managing draft messaging communications of a group-based communication system, the computer-implemented method comprising receiving a user identifier and a group identifier; accessing a plurality of group-based communication channel identifiers based on the user identifier and the group identifier; causing rendering of a group-based communication channel list to a channel list pane of a group-based communication interface based on the group-based communication channel identifiers; querying a group-based communication repository for all draft messaging communications associated with both the user identifier and the group identifier; and in a circumstance where the query of the group-based communication repository returns at least one draft messaging communication, causing rendering to the channel list pane of a draft list icon. In another embodiment, the draft list icon is a pencil icon.

Still other embodiments are directed to a computer-implemented method for managing draft messaging communications of a group-based communication system, the computer-implemented method comprising receiving, from a client device, a draft sync request associated with a user identifier and a group identifier; querying a group-based communication repository for all draft messaging communications associated with each of the user identifier and the group identifier, wherein each draft messaging communication comprises draft message metadata; and transmitting all draft messaging communications returned by the query to the client device. In another embodiment, the draft sync request is received via a draft message application programming interface. In another embodiment, the draft sync request is associated with the user identifier, the group identifier, and a client last updated timestamp and querying the group-based communication repository comprises querying the group-based communication repository for all draft messaging communications associated with each of the user identifier and the group identifier that have a last updated timestamp subsequent to the client last updated timestamp.

Still other embodiments are directed to a computer program product for managing draft messaging communications of a group-based communication system, the computer program product comprising at least one non-transitory computer readable storage medium having computer executed program code instructions stored therein, the computer executable program code instructions comprising program code instructions configured to receive, from a first client device associated with a user identifier, a create draft message request associated with a first draft messaging communication, wherein the first draft messaging communication comprises first draft message metadata; program code instructions configured to cause storage of the first draft messaging communication in a group-based communication repository; and program code instructions configured to propagate the first draft messaging communication to all client devices associated with the user identifier.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWINGS

Figure 1:
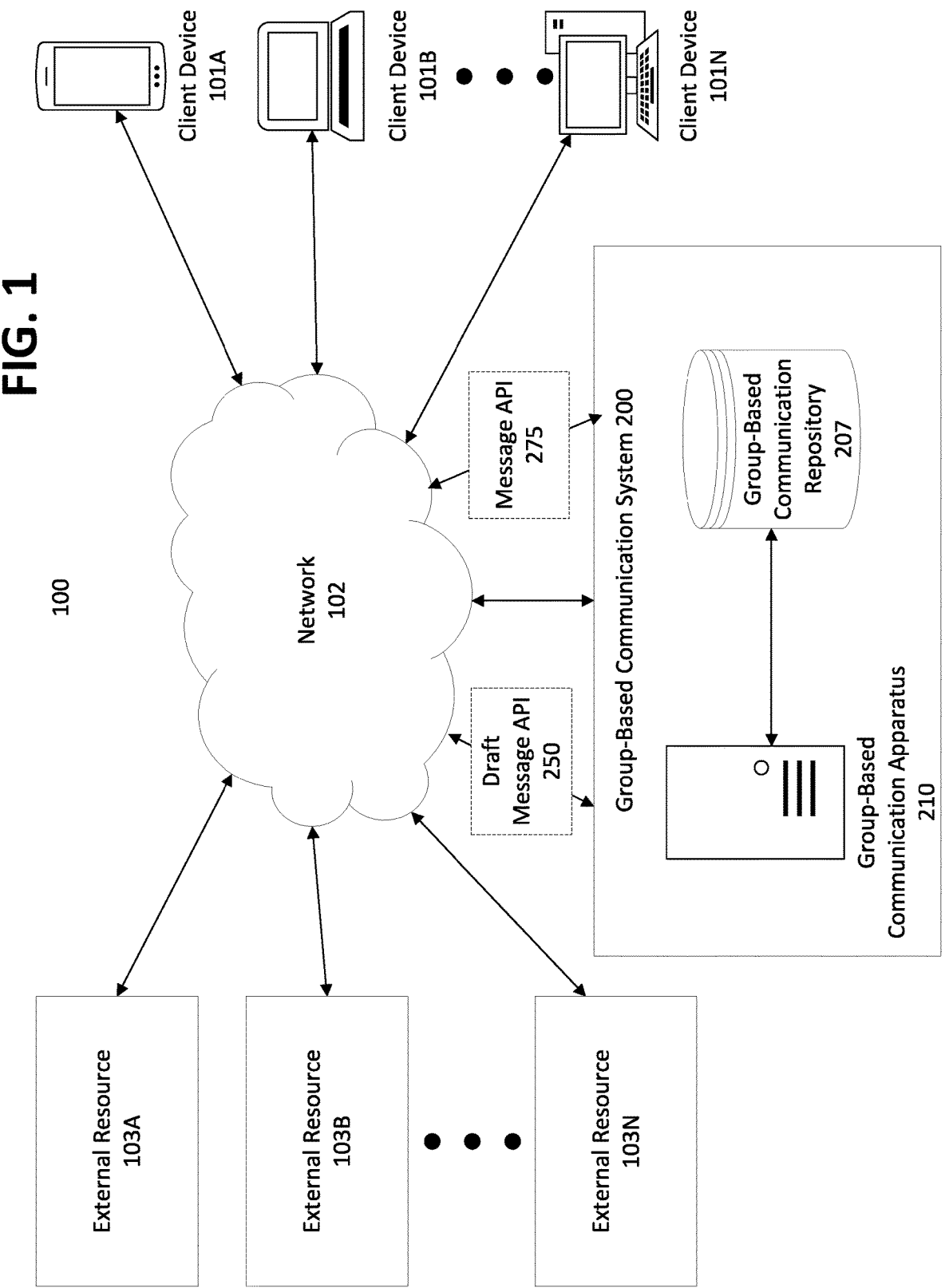
Figure 2:
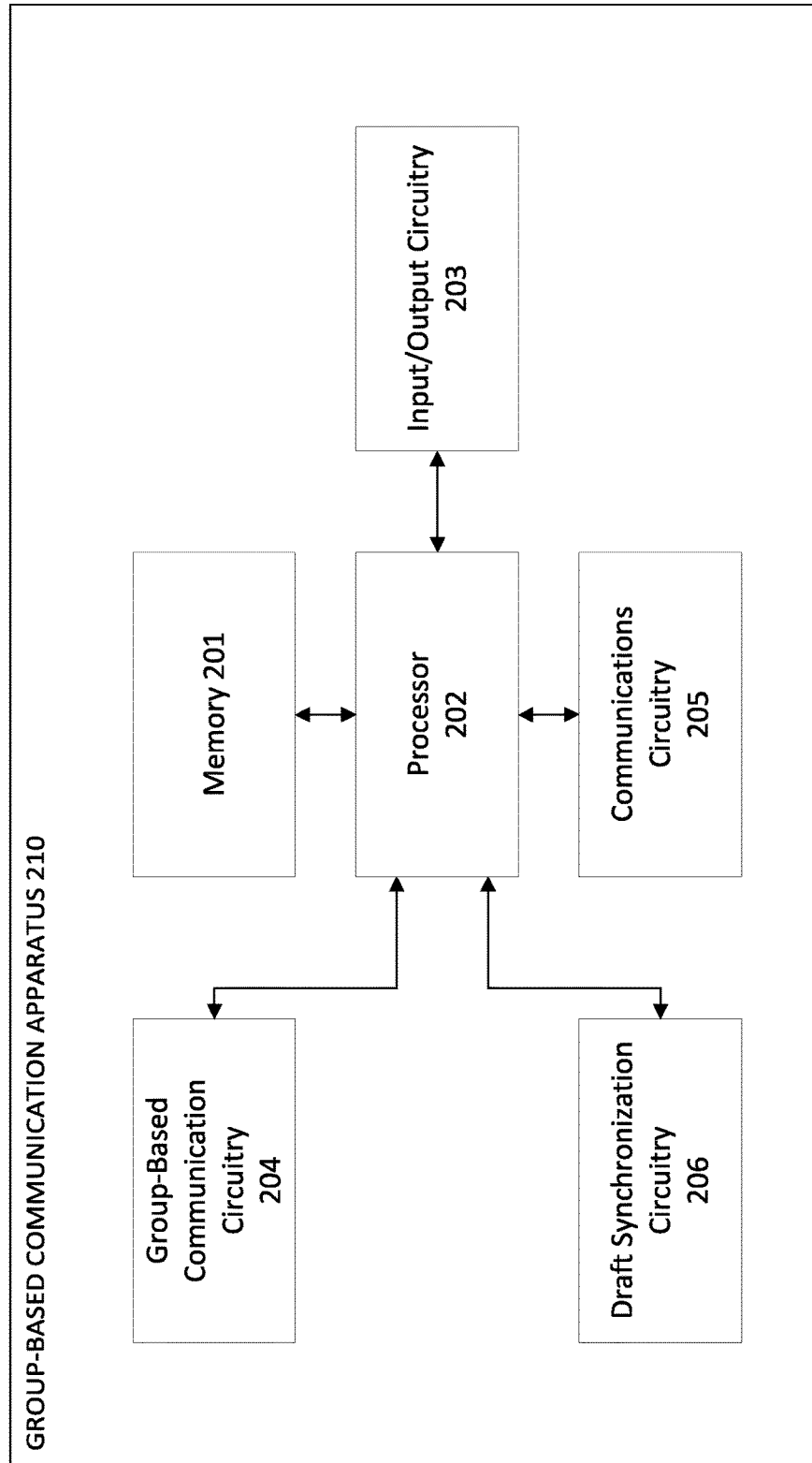
Figure 3:
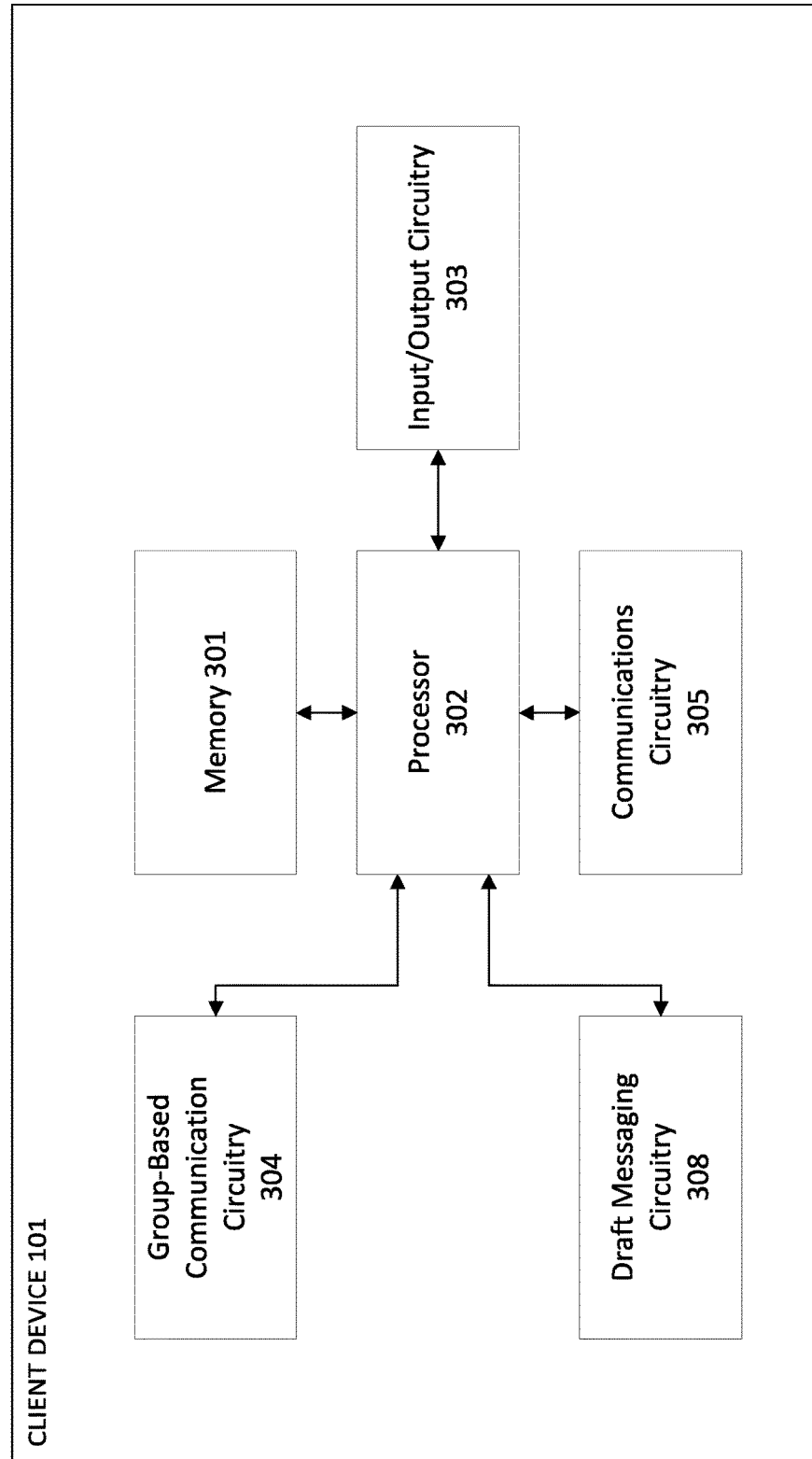
Figure 5A:
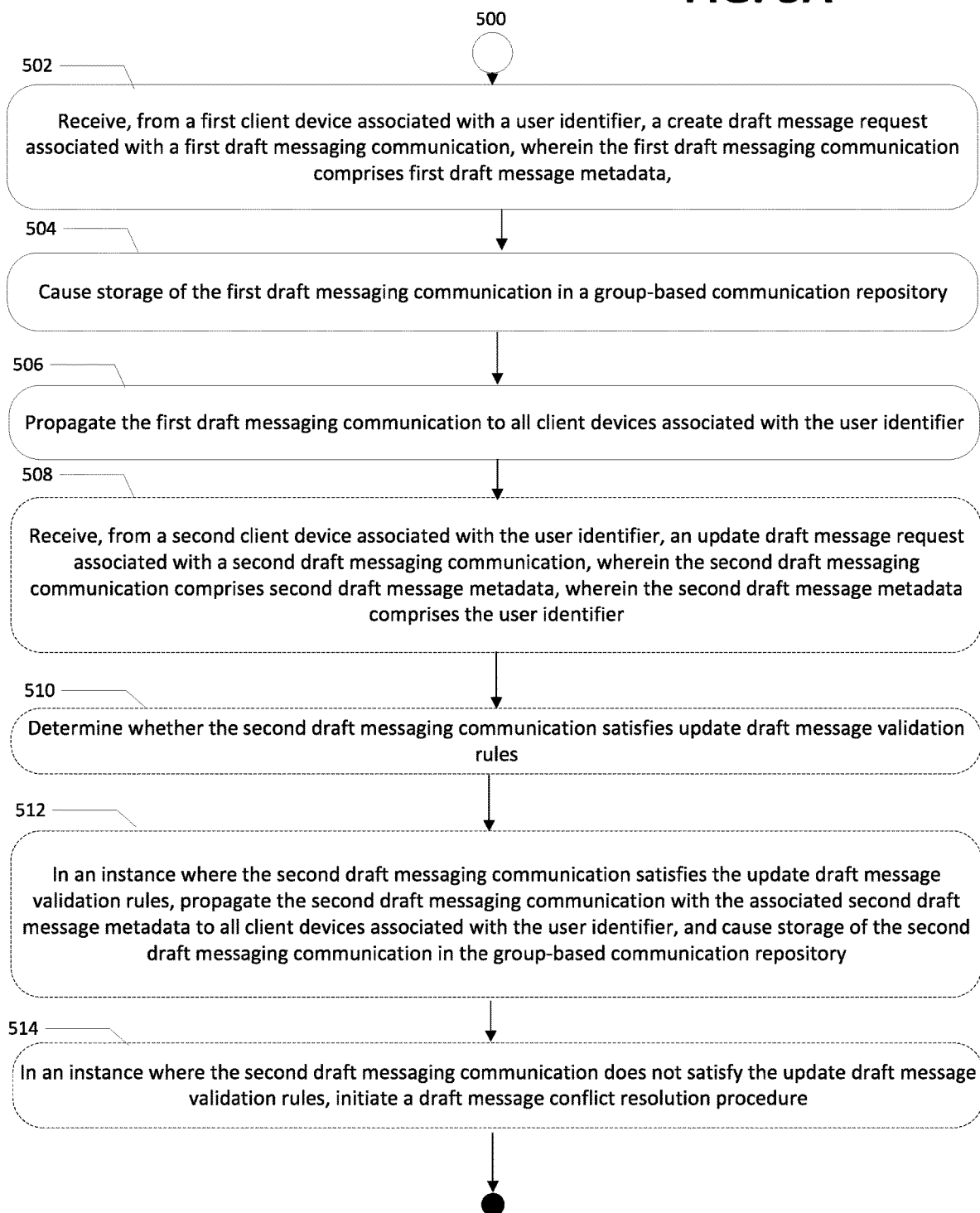
Figure 5B:
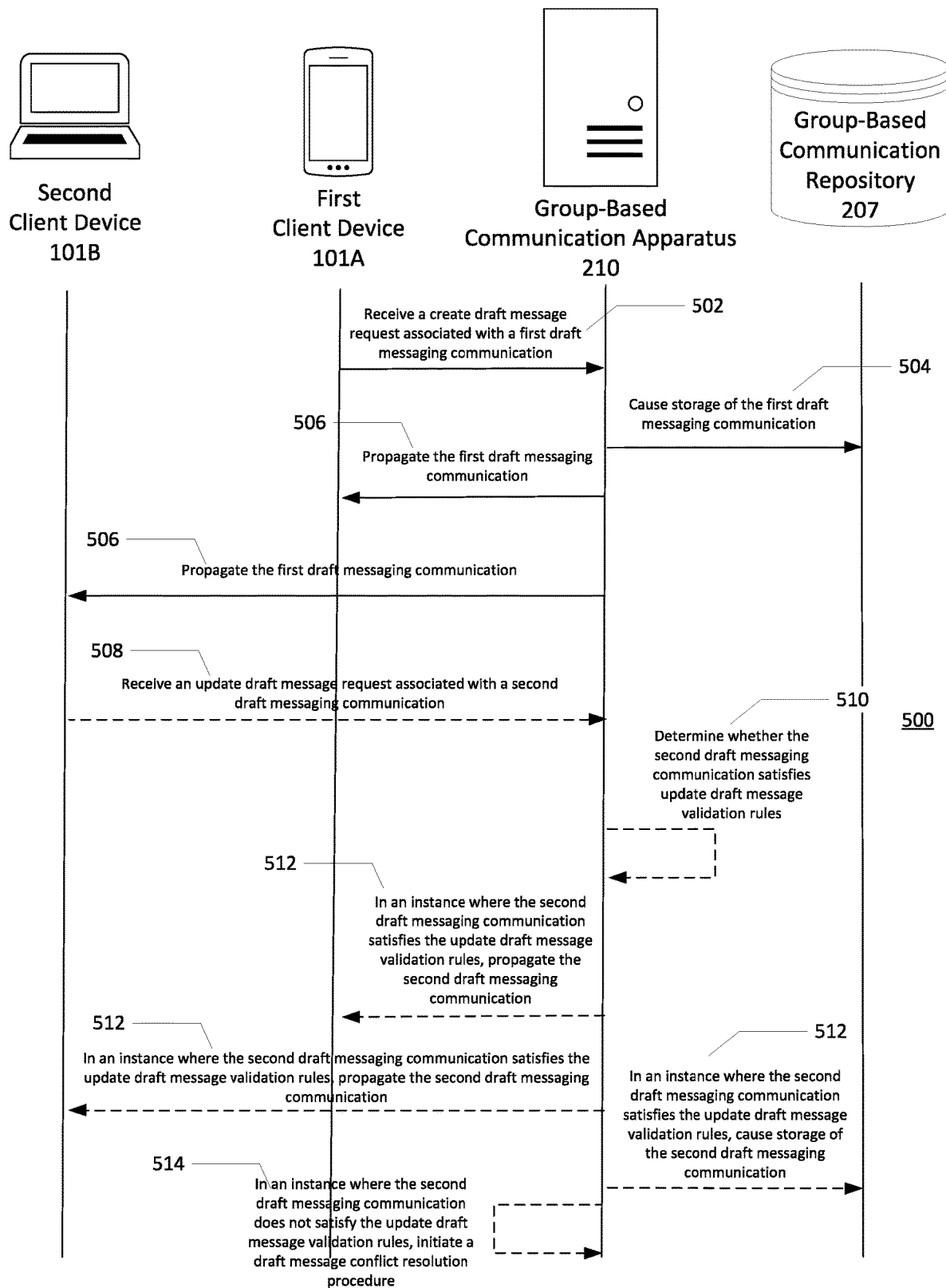
Figure 6:
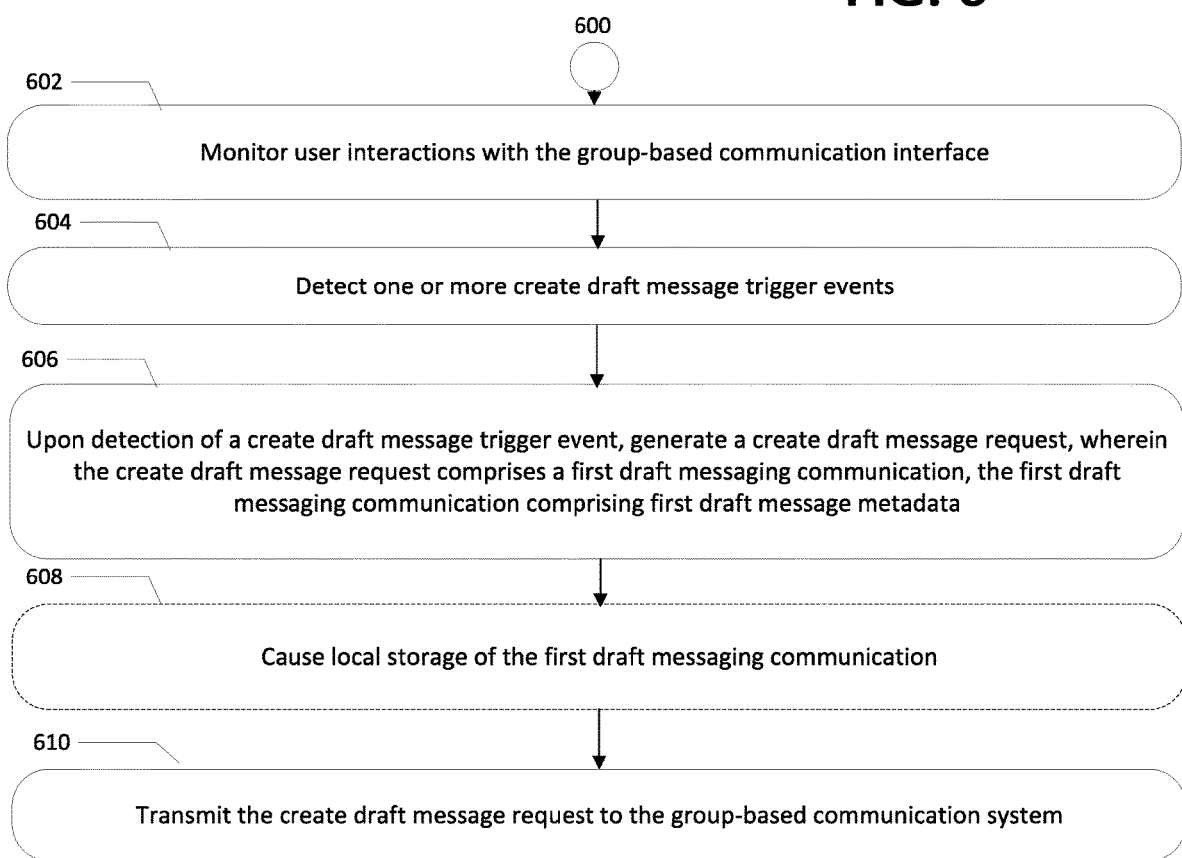

Having thus described some embodiments in general terms, reference will now be made to the accompanying drawings, which are not necessarily drawn to scale, and wherein:

FIG. 1 illustrates a schematic view of a group-based communication system in communication with client devices and external resources according to various embodiments of the present invention;

FIG. 2 illustrates a schematic view of a group-based communication apparatus, in accordance with some example embodiments;

FIG. 3 illustrates a schematic view of circuitry embodying a client device, in accordance with some example embodiments;

FIG. 4A illustrates an example draft message interface component associated with a group-based communication interface configured in accordance with one embodiment;

FIG. 4B illustrates an example draft message interface component comprising user input configured in accordance with one embodiment;

FIG. 4C illustrates an example group-based communication interface comprising a rendering of a draft list icon in accordance with one embodiment;

FIG. 5A is a flowchart illustrating example operations for synchronizing a draft messaging communication and updates thereto across a group-based communication system in accordance with one embodiment;

FIG. 5B illustrates an example signal diagram illustrating data flow interactions between a group-based communication apparatus, a group-based communication repository, and one or more client devices when creating, updating, and synchronizing a draft messaging communication in accordance with one embodiment; and FIG. 6 is a flowchart illustrating example operations for managing draft messaging communications in accordance with one embodiment.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Many users may desire to access a group-based communication system via a plurality of different client devices, such as smart phones, tablet computers, laptop computers, and/or the like. Circumstances may require that such users begin drafting a messaging communication on a first client device but complete the messaging communication on one or more other client devices. For example, when drafting a messaging communication for posting in a group-based communication channel, a user may start writing the draft messaging communication on a first client device, such as a smart phone, continue editing the draft messaging communication on a second client device, such as a tablet computer, and post the draft messaging communication as a messaging communication to the desired group-based communication channel from a third client device, such as laptop computer. Such drafting, accessing, and editing across multiple client devices is not possible in group-based communication systems that only store draft messaging communications locally to a single client device. Thus, it is desirable for the group-based communication system to support remote storage and synchronization of draft messages including any revisions or edits made thereto across multiple client devices.

Additionally, in current systems lacking remote storage and synchronization of draft messages, draft messaging communications are lost between multiple sessions on the same client device. That is, if a user logs out of a session on a client device such as a laptop, all draft messaging communications from that session are lost. Similar issues arise when a user updates or upgrades a client device. For example, if a user changes a client device to a newer model or upgrades the software application providing access to a group-based communication system, all draft messaging communications are lost. Thus, Applicant has determined that it is desirable for the group-based communication system to support persistence of draft messaging communications not only across multiple client devices but also with the group-based communication system itself.

Applicant has identified that providing for draft message synchronization across multiple client devices associated with a user account is important to improving any implementation of a group-based communication system. Using only local client device storage for draft messaging communications inhibits draft message scalability and the convenience afforded by synchronization across all devices. Draft message synchronization, however, can introduce difficulties when a remote computing platform (e.g., group-based communication platform) is not disposed in an active network communication with a client device when a draft messaging communication is managed (i.e., created, updated, deleted, posted, and/or the like). For example, if its network connection is lost, a client device may not be operating with the most recent version of the draft messaging communication. Thus, it is also desirable for the group-based communication system to support conflict resolution of any version control issues encountered in the synchronization of draft messages and any revisions or edits made thereto across multiple client devices.

Accordingly, the present disclosure provides a technological improvement that results in an improved group-based communication apparatus that is configured to efficiently manage draft messages associated with a group-based communication system. In various embodiments, the group-based communication apparatus is configured to synchronize a user's draft messaging communications across multiple client devices.

In one example, a group-based communication apparatus receives a create draft message request from a first client device associated with a user identifier. The create draft message request is associated with a first draft messaging communication comprising first draft message metadata. The group-based communication apparatus stores the first draft messaging communication with the associated first draft message metadata in a group-based communication repository and then propagates the first draft messaging communication with the associated first draft message metadata to all client devices associated with the user identifier, allowing users to be able to access such draft messaging communication from their other client devices associated with the group-based communication system.

In other embodiments, the group-based communication apparatus receives an update draft message request from a second client device associated with the user identifier. The update draft message request is associated with a second draft messaging communication comprising second draft message metadata, such second draft message metadata comprising the user identifier. In such circumstances, the group-based communication apparatus is configured to determine whether the second draft messaging communication satisfies update draft message validation rules and when such rules are satisfied, the group-based communication apparatus propagates the second draft messaging communication with the associated second draft message metadata to all client devices associated with the user identifier and further causes storage of the second draft messaging communication with the associated second draft message metadata in the group-based communication repository.

In some embodiments, the group-based communication apparatus is configured with one or more application programming interfaces (APIs) accessible to the client devices. For example, in some embodiments, the group-based communication apparatus is configured with a draft message API, wherein the draft message API is configured to receive requests associated with draft messaging communications, including create draft message requests, update draft message requests, delete draft message requests, and draft sync requests. In still further embodiments, the group-based communication apparatus is configured with a message API, wherein the message API is configured to receive requests such as post message requests.

In other embodiments, the group-based communication apparatus is configured to render a draft list icon in a sidebar pane, thereby providing visual indicia to a user that there is a draft messaging communication associated with one or more of the group-based communication channels contained in the rendering of a group-based communication channel list.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, repeaters, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, repeaters, and/or the like.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in the at least one embodiment of the present invention and may be included in more than one embodiment of the present invention (importantly, such phrases do not necessarily refer to the same embodiment).

The terms "illustrative," "example," "exemplary" and the like are used herein to mean "serving as an example, instance, or illustration" with no indication of quality level. Any implementation described herein as "exemplary" is not necessarily to be construed as preferred or advantageous over other implementations.

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "or" is used herein in both the alternative and conjunctive sense, unless otherwise indicated.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like. FIG. 3 illustrates a schematic view of a client device in accordance with one embodiment herein.

The term "user" should be understood to refer to an individual, group of individuals, business, organization, and the like. The users referred to herein are enabled to access a group-based communication system using client devices. Each user of the group-based communication system is associated with at least one "group identifier". Each group identifier is a unique number. For example, in one embodiment, a group identifier may be stored as a 64-bit unsigned integer and represented externally (outside of memory) as a base-34 encoded string.

The term "group-based" is used herein to refer to a system, channel, communication, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, users, group-based communication channels, etc., with specific groups of a group-based communication system as defined below.

The term "group-based communication system" refers to a communications software platform and associated hardware that is configured to support and maintain a plurality of group-based communication workspaces and all associated functionality. Group-based communication system users are organized into organization groups (e.g., employees of different companies may be separate organization groups) and each group interacts with the system via a respective group-based communication workspace. For example, the group-based communication system might support, among others, a Slack Corporation group-based communication workspace and an ACME Corporation group-based communication workspace. Example group-based communication systems comprise supporting servers, client devices, and third-party resources.

The terms "user profile," "user account," and "user account details" refer to information of a group-based communication system that is associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user profile details can include a subset designation of user credentials, such as, for example, login information for the user including the user's username and password.

The term "user identifier" refers to one or more items of data by which a user and this user's corresponding user account may be identified within a group-based communication system. For example, a user identifier may comprise ASCII text, a pointer, a memory address, or other unique identifier.

The terms "group identifier" or "team identifier" refer to one or more items of data by which a group within a group-based communication system may be identified. For example, a group identifier may comprise ASCII text, a pointer, a memory address, and the like. Group identifiers are used to distinguish group-based communication channels, messages, files, members, etc., associated with one group-based communication workspace from another group-based communication workspace.

The term "group-based communication server" refers to a software platform and associated hardware that is configured to manage access to the various group-based communication workspaces (defined below) of the group-based communication system. The group-based communication server is configured to access, maintain, and support application product logic of the group-based communication system and to access one or more data repositories such as a group-based communication repository.

The term "group-based communication workspace" refers to a virtual communications environment configured to facilitate user interaction with a group-based communication system. Each group-based communication workspace is accessible and viewable (as a group-based communication interface defined below) to a select group of users, such as a group of employees of a business or organization (e.g., the Slack Corp. interface would be accessible and viewable to the Slack employees however the ACME Corporation group-based communication workspace would not be accessible and viewable to Slack employees). The group-based communication workspace includes a plurality of group-based communication channels (e.g., a marketing channel, sales channel, accounting channel, etc.), which are defined herein. In various embodiments, user profiles sharing a common group identifier (defined below) form part of a common group-based communication workspace.

The term "group-based communication platform" refers to a computing platform embodied for the purpose of supporting a group-based communication system, as a collection of computing services that are accessible to one or more client devices, and that are operable to provide access to a plurality of software applications related to operations of databases. In some examples, the group-based communication platform may take the form of one or more central servers disposed in communication with one or more additional servers running software applications and having access to one or more databases storing digital content items, application-related data, and/or the like.

The term "group-based communication interface" is a graphical user interface of a group-based communication system that is configured to allow users to (e.g., group members) to view and engage a group-based communication workspace. A group-based communication interface is rendered to a client device based on data and instructions provided by the group-based communication system. In some embodiments, such data and instructions are facilitated by a dedicated software application running on the client device. In other embodiments, such data and instructions are provided through a web browser running on the client device.

The term "group-based communication application" refers to a dedicated software program, application, platform, service, or web browser running on a client device which provides the user access to the group-based communication system. Such group-based communication application is typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

The term "group-based communication channel" refers to a virtual communications environment or feed that is configured to display messaging communications posted by channel members (e.g., validated users accessing the environment using client devices) that are viewable only to the members of the channel. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel Group-based communication channels are typically organized or arranged (e.g., alphabetically) in list form within a sidebar pane of the group-based communication interface based on the channel titles or names.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group-based communication message," "messaging communication," and "message" refer to any electronically generated digital content object provided by a user using a client device that has been sent or posted to, and is configured for display within, a group-based communication channel Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication, digital content object, or body content data. Each message sent or posted to a group-based communication channel of the group-based communication system includes message metadata comprising the following: a sending user identifier, a message identifier, message contents, a timestamp that identifies the time of the message, a group identifier, and a group-based communication channel identifier. Each of the foregoing identifiers may comprise ASCII text, a pointer, a memory address, and the like.

The terms "draft messaging communication" and "draft message" refer to a messaging communication or message (defined above) that has not yet been sent, posted, or otherwise transmitted to a group-based communication channel Draft message communications may include any text, image, video, audio or combination thereof provided by a user (using a client device). For instance, the user may provide a draft messaging communication that includes text as well as an image and a video within the draft messaging communication as draft message contents. In such a case, the text, image, and video would comprise the draft messaging communication, digital content object, or draft body content data. Each draft message of the group-based communication system includes "draft message metadata." In some embodiments, draft message metadata comprises one or more of the following: a user identifier, a group identifier, a draft identifier, a version identifier, draft message contents or draft body content data, a last updated timestamp, and a client identifier. In some embodiments, draft message metadata further comprises a channel identifier if it is associated with a group-based communication channel. In alternative embodiments, a draft message is not associated with a group-based communication channel. In still other embodiments, draft message metadata further comprises a thread identifier associated with a thread. In still further embodiments, the draft message metadata comprises a thread timestamp value associated with a thread parent message if the draft message is associated with a thread. Each of the foregoing identifiers may comprise ASCII text, a pointer, a memory address, and the like.

The term "draft identifier" refers to one or more items of data by which a draft messaging communication may be identified as a draft within a group-based communication system. For example, a draft identifier may comprise ASCII text, a pointer, a memory address, or other unique identifier. In some embodiments, draft identifiers are used to distinguish draft messaging communications from posted messaging communications. In some embodiments, the draft identifier is generated and assigned by the group-based communication apparatus. In other embodiments, the draft identifier is generated and assigned by a client device.

The term "version identifier" refers to one or more items of data by which a specific version of a draft messaging communication may be identified within a group-based communication system. For example, a version identifier may comprise ASCII text, a pointer, a memory address, or other unique identifier. In some embodiments, version identifiers indicate when the draft message was last updated. That is, in some embodiments, a version identifier is reflective of whether the draft messaging communication is current (up-to-date). Version identifiers are used to distinguish different versions of draft messages upon being subjected to update draft message validation rules. The version identifier for a draft messaging communication may be an increasing numeric number, wherein the version identifier increases with each update of the draft messaging communication. However, it should be understood that other configurations are possible (e.g., alphanumeric values, hashes, and/or the like). In some embodiments, the version identifier is generated and assigned by the group-based communication apparatus. In other embodiments, the version identifier is generated and assigned by a client device. In some embodiments, version identifiers are used in group-based communication systems allowing for collaborative editing of a draft messaging communication. In such embodiments, the version identifier comprises storing a revision (i.e., a list of changes to the previous version) and a revision number.

The term "thread timestamp" refers to a digital representation of network time associated with the posting of a parent message to a group-based communication thread associated with a group-based communication channel. All messages or draft messages that comprise identical thread timestamps are associated with the same thread, thus, the thread timestamp may be analyzed to determine to which thread a message or draft message belongs. In some embodiments, the virtual communications environment or feed in a group-based communication channel is displayed in a nearly linear timeline of messaging communications posted by users. When a user replies to a message, that original message becomes the parent message of a thread. In some embodiments, the threaded reply messages are configured to display as a forked timeline descending from the parent message of the thread. Any message or draft message that comprises a thread timestamp as part of its message metadata or draft message metadata is attributed to a thread. In various embodiments, if the draft message is associated with a thread, the thread timestamp value is a parameter associated with draft message metadata.

The term "last updated timestamp" refers to a digital representation of network time associated with the saving of a draft messaging communication to the group-based communication repository, thus, indicative of when an update to or creation of a draft messaging communication in the group-based communication repository last occurred. The last updated timestamp is generated and assigned (and in some embodiments, revised) by the group-based communication apparatus.

The term "client last updated timestamp" refers to a digital representation of network time associated with the syncing of draft messaging communications to the local storage of a client device with the group-based communication apparatus. In some embodiments, the client last updated timestamp serves as an initial starting point in time for querying the group-based communication repository for draft messaging communications that have been created, updated, or otherwise revised since the client last updated timestamp.

The term "subsequent" refers to a description of the relative timing of an action or occurrence, where the occurrence at issue occurs chronologically after a first action or occurrence. In embodiments, subsequent refers to a relationship among a sequence of two or more timestamps.

The term "client identifier" refers to one or more items of data by which a client device may be identified within a group-based communication system. For example, a client identifier may comprise ASCII text, a pointer, a memory address, or other unique identifier. In some embodiments, the draft message metadata comprises the client identifier of the client device that created, revised, edited, or deleted a draft messaging communication. In some examples, the client identifier can be included in a request, event, or other transmission to provide the user with additional information when a conflict occurs between two or more draft messaging communications.

The term "group-based communication object" refers to electronic data objects or digital content objects specifically executable and/or otherwise accessible via the group-based communication system and/or at least one external resource. Group-based communication objects may be received at the group-based communication system by receiving those group-based communication objects conveyed to (pushed to) the group-based communication system, or the group-based communication system may retrieve (pull to) various group-based communication objects stored within accessible storage areas of one or more client devices, external resources, and/or the like. The group-based communication objects include body content data and metadata. The body content data of the group-based communication objects may be interpreted by the group-based communication apparatus to display or otherwise convey human-readable representations of information and/or computer-executable content that causes a particular client device to operate in a particular way. Specifics of certain group-based communication objects examples are discussed herein, however, it should be understood that in certain embodiments, group-based communication objects may be embodied as messaging communications, draft messaging communications, emails, events, audio files, video files, document files, spreadsheet files, presentation files, tasks, and/or the like; as well as any contextual data corresponding therewith. Group-based communication objects may thus be non-personal (alternatively referred to as public) as they are exchanged between a plurality of users or otherwise made available to a plurality of users. Alternatively, group-based communication objects may be personal in nature (e.g., as defined by a portion of metadata associated with the group-based communication object), such that access to the content of the group-based communication object is limited to a single user (or a limited number of defined users). For example, group-based communication objects personal to a single user may encompass tasks or task lists defined personally by and for a particular user. Access to personal group-based communication objects may be limited to access requests associated with defined user identifiers. In certain embodiments, personal group-based communication objects may be represented as encrypted data when indexed in database storage areas and/or when included within work graph data structures including personal and non-personal group-based communication objects.

A "sending user identifier" is associated with a collection of messages that are sent by a particular user (e.g., sent by a client device associated with the particular user, client identifier, user identifier, or user profile). These messages may be analyzed or parsed to determine context regarding the user (e.g., the user's expertise or interest in a topic may be determined based on the frequency of mention of the topic or key words associated with the topic within such messages). A sending user identifier may comprise ASCII text, a pointer, a memory address, and the like.

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access settings such that it is not generally accessible and/or searchable by other members of the group-based communication system (i.e., members associated with other group-based communication workspaces). For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "permitted group-based communication channel(s)" refers to one or more group-based communication channels or private group-based communication channels that have been approved or authenticated for access by a user (e.g., a user profile) associated with a selected user identifier.

The term "create draft message request" refers to an electrically generated digital object that indicates that a user has provided an input (or the user's passive actions indicate an input) comprising a request to create and store a draft messaging communication in the group-based communication repository. To provide further context, a create draft message request is generated at a client device in response to a user interaction with a group-based communication interface presented on a display screen of the client device. A user can cause the client device to generate a create draft message request in numerous ways, for example, by interacting with and providing input to a draft message interface component that forms part of the group-based communication interface, by not interacting with the draft message interface component for a period of time satisfying a draft message interface inactivity threshold, by placing the group-based communication interface comprising the draft message interface component in the background of the client device or closing the group-based communication interface, or by interacting with a specific draft message creation actuator button that forms part of the group-based communication interface.

A create draft message request is sent to and received by the group-based communication apparatus. In some embodiments, the group-based communication apparatus is configured with a draft message API, wherein the draft message API is configured to receive such requests associated with draft messaging communications. Thus, the create draft message request is sent to and received via the draft message API. In such embodiments comprising a draft message API, the draft identifier is generated and assigned by the group-based communication apparatus discussed below. A create draft message request may be represented via a temporary code that notifies the group-based communication apparatus that a user has made the request. In some embodiments, the create draft message request is associated with a draft messaging communication which further comprises draft message metadata. Receipt of the create draft message request by the group-based communication apparatus triggers the group-based communication apparatus to cause storage of the draft messaging communication with the associated draft message metadata in a group-based communication repository and propagate the draft messaging communication with the associated draft message metadata to all client devices associated with the user identifier.

The term "update draft message request" refers to an electrically generated digital object that indicates that a user has provided an input (or the user's passive actions indicate an input) comprising a request to update and store a draft messaging communication in the group-based communication repository. To provide further context, an update draft message request is generated in response to a user interaction with a group-based communication interface presented on a display screen of a client device. A user can cause the client device to generate an update draft message request in numerous ways, for example, by interacting with and providing input to a draft message interface component that forms part of the group-based communication interface, by not interacting with the draft message interface component for a period of time satisfying a draft message interface inactivity threshold, by placing the group-based communication interface comprising the draft message interface component in the background of the client device or closing the group-based communication interface, or by interacting with a specific draft message update actuator button that forms part of the group-based communication interface.

An update draft message request is sent to and received by the group-based communication apparatus. In some embodiments, the group-based communication apparatus is configured with a draft message API, wherein the draft message API is configured to receive such requests associated with draft messaging communications. Thus, the update draft message request is sent to and received via the draft message API. An update draft message request may be represented via a temporary code that notifies the group-based communication apparatus that a user has made the request. In some embodiments, the update draft message request is associated with a draft messaging communication which further comprises draft message metadata, including at least a draft identifier. Receipt of the update draft message request by the group-based communication apparatus triggers the group-based communication apparatus to determine if the draft messaging communication satisfies the update draft message validation rules.

The term "delete draft message request" refers to an electrically generated digital object that indicates that a user has provided an input comprising a request to delete a draft messaging communication in the group-based communication repository. To provide further context, a delete draft message request is generated in response to a user interaction with a group-based communication interface presented on a display screen of a client device. A user can cause the client device to generate a delete draft message request, for example, by interacting with a specific delete draft message actuator button that forms part of the group-based communication interface or by removing all of the content of the draft message interface component. A delete draft message request is sent to and received by the group-based communication apparatus. In some embodiments, the group-based communication apparatus is configured with a draft message API, wherein the draft message API is configured to receive such requests associated with draft messaging communications. Thus, the delete draft message request is sent to and received via the draft message API. A delete draft message request may be represented via a temporary code that notifies the group-based communication apparatus that a user has made the request. In some embodiments, the delete draft message request is associated with a draft identifier. Receipt of the delete draft message request by the group-based communication apparatus triggers the group-based communication apparatus to query the group-based communication repository for all draft messaging communications associated with the provided draft identifier and delete all draft messaging communications associated with the draft identifier stored in the group-based communication repository that are returned by the query. In some embodiments, receipt of the delete draft message request by the group-based communication apparatus also triggers the group-based communication apparatus to propagate a delete draft message event associated with the draft identifier to all client devices associated with the user identifier and the group identifier. This delete draft message event directs the client devices to also delete all draft messaging communications associated with the draft identifiers that are stored locally by the client devices.

The term "post message request" refers to an electrically generated digital object that indicates that a user has provided an input comprising a request to post a draft messaging communication as a messaging communication to a group-based communication channel of the group-based communication interface. A post message request is generated in response to a user interaction with a group-based communication interface presented on a display screen of a client device. A user can cause the client device to generate a post message request by interacting, for example, with a specific post message actuator button that forms part of the group-based communication interface. In some embodiments, the user can cause the client device to generate a post message request simply by pressing a button or key (e.g., pressing "enter" on a physical keyboard or keyboard displayed on a client device), or otherwise interacting with an input device associated with the client device to indicate the user's desire to post the draft message as a message. A post message request is sent to and received by the group-based communication apparatus.

In some embodiments, the group-based communication apparatus is configured with a message API, wherein the message API is configured to receive such requests associated with messaging communications. Thus, the post message request is sent to and received via the message API. A post message request may be represented via a temporary code that notifies the group-based communication apparatus that a user has made the request. In some embodiments, the post message request is associated with a draft identifier and a channel identifier, the channel identifier associated with a group-based communication channel of the group-based communication interface associated with the group identifier. Receipt of the post message request by the group-based communication apparatus triggers the group-based communication apparatus to generate a messaging communication based on the draft messaging communication and cause rendering of the messaging communication to the group-based communication channel of the group-based communication interface.

In some embodiments, receipt of the post message request by the group-based communication apparatus also triggers the group-based communication apparatus to delete all draft messaging communications associated with the draft identifier stored in the group-based communication repository and propagate a delete draft message event associated with the draft identifier to all client devices associated with the user identifier. This delete draft message event directs the client devices to also delete all draft messaging communications associated with the draft identifiers that are stored locally by the client devices.

The term "draft sync request" refers to an electrically generated digital object that indicates that a user has provided an input comprising a request to synchronize all draft messaging communications with the group-based communication repository. To provide further context, a draft sync request is generated in response to a user interaction with a group-based communication interface presented on a display screen of a client device. A user can cause the client device to generate a draft sync request, for example, by interacting with a specific draft sync actuator button that forms part of the group-based communication interface or by simply accessing the group-based communication system. For example, in some embodiments, when the user starts, opens or otherwise accesses a dedicated software application or a web browser running on the client device which provides access the user to the group-based communication system, the client device generates the draft sync request. In some embodiments, when the communication connection between a client device and the group-based communication platform is offline, interrupted, disrupted, disconnected, or otherwise lost, the client device will generate the draft sync request when the communication connection is returned, brought online, or otherwise reconnected.

A draft sync request is sent to and received by the group-based communication apparatus. In some embodiments, the group-based communication apparatus is configured with a draft message API, wherein the draft message API is configured to receive such requests associated with draft messaging communications. Thus, the draft sync request is sent to and received via the draft message API. A draft sync request may be represented via a temporary code that notifies the group-based communication apparatus that a user has made the request. In some embodiments, the draft sync request is associated with a user identifier and a group identifier. Receipt of the draft sync request by the group-based communication apparatus triggers the group-based communication apparatus to query a group-based communication repository for all draft messaging communications associated with each of the user identifier and the group identifier and transmit all draft messaging communications returned by the query to the client device. In still other embodiments, the draft sync request is associated with a client last updated timestamp.

The term "user input" refers to user interaction, via a graphical user interface, with the group-based communication interface or components thereof. Such user input with the draft message interface component may be via a multitude of interactions, such as, but not limited to, "non-keystroke engagement" or "keystroke engagement." Non-keystroke engagement refers to user interaction in which such user interaction is free from (i.e., excludes) the entering of one or more (e.g., keystroke) characters into a group-based communication interface. For example, touch-screen or mouse click engagement with a draft message interface component is one example of non-keystroke engagement. The term "keystroke engagement" refers to entering of one or more keystrokes into, for example, a draft message interface component of the group-based communication interface. For example, input of one or more characters (e.g., alphanumeric characters or emojis) into a draft message interface component is one example of keystroke engagement. In some embodiments, once detected, the user input forms the draft message contents or draft body content data of a draft message.

The term "draft message interface component" refers to a user interface element that is rendered to a group-based communication interface and is configured to enable a user to generate, view, input, edit and/or modify draft messaging communications. In some embodiments, the draft message interface component is associated with a group-based communication channel interface. In some embodiments, the draft message interface component is an individual component of a group-based communication interface (a single pane or component being visible within a particular display window). In other embodiments, the draft message interface component is associated with the group-based communication channel interface but is rendered in a separate display window. In still other embodiments, the draft message interface component is not associated with a group-based communication channel interface. The draft message interface component 415 of FIGS. 4A-4C are examples of draft message interface components.

The term "draft message interface inactivity threshold" refers to a cutoff time difference associated with the user's last interaction or engagement with the draft message interface component. In some embodiments, the draft message interface inactivity threshold is satisfied if the time difference since the user's interaction or engagement with the draft message interface component exceeds, for example, 1 second, 2 seconds, 30 seconds, 1 minute, 2 minutes, etc. In some embodiments, for example, in those instances wherein the client device is a desktop or laptop computer, the draft message interface inactivity threshold is more aggressive than compared to a mobile device. In some embodiments, the user can adjust the draft message interface inactivity threshold.

The term "update draft message validation rules" should be understood to refer to a defined set of parameters, conditions, procedures, rules, steps, limitations, configurations, and/or policies for regulating the updating, editing, or revising of a draft message in a group-based communication system. In some embodiments, the update draft message validation rules define the parameters, criteria, or conditions to determine whether a draft messaging communication is a valid updated draft messaging communication. If a draft messaging communication is a valid updated draft messaging communication, such draft messaging communication satisfies the update draft message validation rules. For example, in some embodiments, determining if a draft messaging communication satisfies update draft message validation rules comprises querying the group-based communication repository to determine whether the specified draft identifier received with the update draft message request exists for the querying user, and further determining whether certain parameters (e.g., certain pre-defined draft message metadata) associated with the draft messaging communication received from a client device are equal to corresponding parameters (i.e., version identifiers or last updated timestamps) associated with the draft messaging communication already saved in the group-based communication repository or otherwise validated based on data stored to the group-based communication repository.

In one example, update draft message validation rules are satisfied when the group-based communication apparatus determines that both (1) a received draft identifier exists in the group-based communication repository, and (2) certain received parameters among the draft message metadata are validated by corresponding parameters associated with a draft messaging communication stored in the group-based communication repository. In this example, the update draft message validation rules are not satisfied (i.e., the draft messaging communication received from the client device and associated with the update draft message request is not authenticated and thus fails the update draft message validation rules) when the group-based communication apparatus determines that either (1) the received draft identifier does not exist in the group-based communication repository, or (2) that certain received parameters among the draft message metadata are not validated by corresponding parameters associated with draft messaging communications previously stored in the group-based communication repository. Additional variations of the update draft message validation rules are also contemplated by this disclosure and definition as will be apparent to one of ordinary skill in the art in view of this disclosure.

If the group-based communication apparatus determines that the draft messaging communication associated with the update draft message request (i.e., the second draft messaging communication) satisfies the update draft message validation rules, the group-based communication apparatus propagates the draft messaging communication to all client devices associated with the user identifier and causes storage of the draft messaging communication in the group-based communication repository. In some embodiments, as discussed in greater detail below, the group-based communication apparatus updates various draft message metadata (e.g., version identifier, etc.) before propagating the draft messaging communication to all client devices associated with the user identifier and causing storage of the draft messaging communication in the group-based communication repository.

The term "draft message conflict resolution procedure" should be understood to refer to a defined set of parameters, procedures, rules, steps, limitations, configurations, and/or policies for managing conflicts associated with draft messaging communications. For example, in some embodiments, a conflict occurs when the group-based communication apparatus receives an update draft message request from a client device wherein the updating is not updating the most recent version of a draft messaging communication as compared to the version previously stored in the group-based communication repository. That is, the possibility exists that an update draft message request was generated while the remote computing platform (e.g., group-based communication platform) was not in communication connection with the client device, and thus, the particular client device does not have the most-current version of the draft message stored locally before the user further instituted edits to the draft message. In some embodiments, the draft message conflict resolution procedure requires disregarding the conflict and overwriting the stored draft messaging communication with the updated draft message as received from the client device. In other embodiments, the draft message conflict resolution procedure stores both versions of the draft messaging communication. In still other embodiments, the draft message conflict resolution procedure transmits an error event to the associated client device notifying the user of such conflict.

In some embodiments, the draft message conflict resolution procedure programmatically generates a proposed draft messaging communication comprising body content data from both versions of the draft messaging communications. In still further embodiments, the proposed draft messaging communication comprises indication(s) of one or more differences between the draft messaging communications. Additional variations of a draft message conflict resolution procedure are also contemplated by this disclosure and definition as will be apparent to one of ordinary skill in the art in view of this disclosure.

The term "delete draft message event" refers to an electrically generated digital object generated by the group-based communication apparatus and sent to certain client devices associated with each of a user identifier and a group identifier. The delete draft message event instructs the client device to delete all draft messages associated with a certain draft identifier that are stored locally to the client device(s).

The term "background mode" refers to the draft message interface component, the group-based communication interface, and/or the dedicated software application or web browser running on the client device which provides access to the user to the group-based communication system operating in or active in a background mode, as opposed to a foreground mode, on the client device. For example, in some embodiments, the draft message interface component/group-based communication interface/dedicated software application/web browser is still actively running on the client device, however, the user is interacting with another component, interface, software application, web browser, or the like operating in the foreground of the client device. The client device may be configured to generate a create draft message request based on the occurrence of such a create draft message trigger event, i.e., when the client device detects that the draft message interface component/group-based communication interface/dedicated software application/web browser is unfocused (i.e., operating in a background mode).

The term "trigger event" should be understood to refer to an event, occurrence, and/or incident that initiates a responsive action by a client device, such as generating create draft message request upon detecting that the user has clicked on or otherwise selected a representative button or executable element which is configured to allow a user to indicate that the user wishes to create a draft messaging communication with the provided user input and/or information entered in a draft message interface component. In some embodiments, trigger events are user-interaction-based. In other embodiments, trigger events are time-based. Other trigger events may be utilized as well as discussed in more detail herein.

The term "external resource" refers to a software program, application, platform, or service that is configured to communicate with the group-based communication system for providing an external service (i.e., not native to the group-based communication system) to a client device via a group-based communication interface and/or via a group-based communication workspaces.

The term "external resource user identifier" refers to one or more items of data by which a user (or user profile) of an external resource may be uniquely identified by a group-based communication system. For example, an external resource user identifier may comprise ASCII text, a pointer, a memory address, and the like. One or more external resource user identifiers may be stored to a user profile of a group-based communication system along with other identifiers (e.g., user identifier, group identifiers, group-based communication channel identifiers, etc.). The external resource user identifier may be embodied in a format native to the external resource or may be structured in a format designated by the group-based communication system. Correlating one or more external resource user identifiers to a user account or user identifier of the group-based communication system allows the group-based communication system to link accounts from disparate external resources with a selected group-based communication system user account. The external resource user identifier may include an integer identifier, a universally unique identifier, an email address, a random string, and/or the like. In such a case, the group-based communication server may receive the external resource user identifier during the open authorization (OAuth) process.

The term "group-based communication repository" refers to the location, such as a memory device, where one or more user activity data logs or other group-based communication data are stored. The group-based communication repository may be a dedicated device and/or a part of a larger repository. The group-based communication repository may be dynamically updated or be static. For example, the user activity data logs may be uploaded to the group-based communication repository simultaneously with the creation of the user activity data logs. Alternatively, the user activity data logs may not be uploaded simultaneously with their creation and instead may be batch uploaded based on other factors, such as based on time intervals (e.g., uploads occur every 15 minutes), user initiation (e.g., user may press a button to initiate the upload), or the like. The group-based communication repository may be encrypted in order to limit unauthorized access of user activity data logs and associated engagement data.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 200 via a communications network 102 using client devices 101A-101N. The group-based communication system 200 may comprise a group-based communication apparatus 210 in communication with at least one group-based communication repository 207. Users may further access features or services of one or more external resources 103A-103N through the group-based communication system 200. Client devices 101A-101N may be configured, in some embodiments, to communication with the group-based communication apparatus 210 via a draft message application programming interface (API) 250 and via a message API 275 as discussed in detail below.

Communications network 102 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 102 may include a cellular telephone, an 802.11, 802.16, 802.20, and/or WiMax network. Further, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a Websocket channel. In some embodiments, the protocol is JSON over RPC ("remote procedural call), JSON over REST ("Representational State Transfer")/HTTP ("HyperText Transfer Protocol"), and the like.

The group-based communication apparatus 210 may be embodied as a computer or computers. The group-based communication apparatus 210 may provide for receiving of electronic data from various sources, including but not necessarily limited to the client devices 101A-101N. For example, the group-based communication apparatus 210 may be operable to receive and post or transmit group-based messaging communications or synchronize draft messaging communications provided by the client devices 101A-101N.

The group-based communication repository 207 may be embodied as a data storage device(s) such as a Network Attached Storage (NAS) device or devices, or as a separate database server or servers. The group-based communication repository 207 includes information accessed and stored by the group-based communication apparatus 210 to facilitate the operations of the group-based communication system 200. For example, the group-based communication repository 207 may include, without limitation, a plurality of messaging communications organized among a plurality of group-based communication channels, a plurality of draft messaging communications, a plurality of user identifiers, and/or the like.

The client devices 101A-101N may be any computing device as defined above. Electronic data received by the group-based communication apparatus 210 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smartphone or tablet, the client device 101A-101N may execute an "app" (i.e., a group-based communication application") to interact with the group-based communication system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally, or alternatively, the client device 101A-101N may interact with the group-based communication system 200 via a web browser. As yet another example, the client devices 101A-101N may include various hardware or firmware designed to interface with the group-based communication system 200.

Each of external resources 103A-103N represents an external system, resource, service, software application, computer, or the like, that a user of a client device associated with a corresponding group-based communication system user account may access via the group-based communication system 200. For example, the group-based communication system 200 may access an external resource via one or more application programming interfaces (APIs). An external resource may provide a specific service via a group-based communication interface of the group-based communication system 200. In one example, an external resource 103A may be a validated software source code repository, or the like, which members of a group-based communication workspace may collectively access as they collaborate to develop a new software application.

An external resource 103A-103N may be embodied in a variety of ways utilizing a variety of computing devices. For example, an external resource 103A-103N may be a computer or server remote from the group-based communication system 200 and accessible over the network 102 (e.g., over the Internet for example).

In some embodiments, the group-based communication system 200 is configured to access an external resource utilizing an external resource user identifier stored by the group-based communication system 200, such as in group-based communication repository 207. The external resource user identifier may include, or otherwise be associated with and retrievable together with, an external resource access token associated with the external resource and/or group-based communication system user account. A group-based communication system 200 may store one or more external resource user identifiers including or associated with an external resource access token(s) to enable API requests to the external resource.

In some embodiments of an exemplary group-based communication system 200, a message or draft messaging communication may be sent from a client device 101A-101N to a group-based communication system 200. In various implementations, the message may be sent to the group-based communication system 200 over communications network 102 directly by a client device 101A-101N, the message may be sent to the group-based communication system 200 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like.

In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>nickname.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
```

```
</client_details>
<client_details> //Android Client with Webbrowser
    <client_IP>10.0.0.123</client_IP>
    <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
    <client_product_type>Nexus S</client_product_type>
    <client_serial_number>YXXXXXXXXXZ</client_serial_number>
    <client_UDID>FXXXXXXXXX-XXXX-XXXX-XXXX-
XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
</client_details>
<client_details> //Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3 Safari/537.75.14</user_agent_string>
    <client_product_type>MacPro5,1</client_product_type>
    <client_serial_number>YXXXXXXXXXZ</client_serial_number>
    <client_UDID>FXXXXXXXXX-XXXX-XXXX-XXXX-
XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
</client_details>
<message>
    <message_identifier>ID_message_10</message_identifier>
    <team_identifier>ID_team_1</team_identifier>
    <channel_identifier>ID_channel_1</channel_identifier>
    <body contents>That is an interesting invention. I have attached a copy our patent
policy.</body contents>
    <attachments>patent_policy.pdf</attachments>
</message>
</auth_request>
```

The group-based communication system 200 comprises at least one group-based communication apparatus 210 that may create a storage message based upon the received message to facilitate message indexing and storage in a group-based communication repository 207. In one implementation, the storage message may include data such as a message identifier, a group identifier, a group-based communication channel identifier, a sending user identifier, topics, responses, message contents (i.e., body contents), attachments, message hierarchy data, third party metadata, conversation primitive data, and/or the like. For example, the group-based communication apparatus 205 may provide the following example storage message, substantially in the form of a HTTP(S) POST message including

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>disclosures</topic>
        <topic>patents</topic>
        <topic>policies</topic>
```

-continued

```
    </topics>
    <responses>
        <response>liked by ID_user_2</response>
        <response>starred by ID_user_3</response>
    </responses>
    <body contents>That is an interesting disclosure. I have attached a
copy our patent policy.</body contents>
    <attachments>patent_policy.pdf</attachments>
    <conversation_primitive>
        conversation includes messages: ID_message_8, ID_message_9,
        ID_message_10, ID_message_11, ID_message_12
    </conversation_primitive>
</storage_message>
```

In embodiments, a sending user identifier may be associated with the message communication. In one implementation, the message may be parsed (e.g., using PHP—i.e., the script language derived from Personal Home Page Tools— commands) to determine a sending user identifier of the user who sent the message.

In some embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In some embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, a group-based communication workspace, a group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the group-based communication channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 207). In one implementation, a storage message may be sent from group-based communication apparatus 210 to facilitate indexing in group-based communication repository 207. In another implementation, metadata associated with the message may be determined and the message may be indexed in group-based communication repository 207. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 207 to facilitate searching. In one embodiment, the files may be indexed such that a company's or a group's files are indexed at a separate distributed repository.

Example Apparatuses for Implementing Various Embodiments of the Present Disclosure The group-based communication apparatus 210 may be embodied by one or more computing systems, such as group-based communication apparatus 210 shown in FIG. 2. The group-based communication apparatus 210 may include a processor 202, a memory 201, input/output circuitry 203, communications circuitry 205, group-based communication circuitry 204, and draft synchronization circuitry 206. The group-based communication apparatus 210 may be configured, using one or more of the circuitry 203, 204, 205, and 206, to execute the operations described herein.

Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 210 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the group-based communication apparatus 210 to carry out various functions in accordance with example embodiments of the present disclosure.

The processor 202 may be embodied in a number of different ways and may, for example, include one or more processing devices configured to perform independently. Additionally, or alternatively, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor 202. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client devices 101A-101N (shown in FIG. 1) to enable message sharing/dissemination therebetween. The processor 202 ensures that messages intended for exchange between the client devices 101A-101N within the particular communication channel are properly disseminated to those client devices 101A-101N for display within respective display windows provided via the client devices 101A-101N.

Moreover, the processor 202 may be configured to synchronize messages exchanged on a particular communication channel with a database for storage and/or indexing of messages therein. In certain embodiments, the processor 202 may provide stored and/or indexed messages for dissemination to client devices 101A-101N. The processor 202 may also provide to distribute such stored and/or indexed messages across various group-based communication workspaces and associated group-based communication channels as discussed herein.

In some embodiments, the group-based communication apparatus 200 may include input/output circuitry 203 that may, in turn, be in communication with processor 202 to provide output to the user and, in some embodiments, to receive an indication of a user input. The input/output circuitry 203 may comprise a user interface (e.g., a group-based communication interface) and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the group-based communication apparatus 210. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The group-based communication circuitry 204 includes hardware and software configured to support a group-based communication system 200. The group-based communication circuitry 204 may utilize processing circuitry, such as the processor 202, to perform these actions. The group-based communication circuitry 204 may send and/or receive data from group-based communication repository 207. In some implementations, the sent and/or received data may be group-based communication objects (e.g., messages, files, links, etc.) organized among a plurality of group-based communication channels. It should also be appreciated that, in some embodiments, the group-based communication circuitry 204 may include a separate processor, specially configured field programmable gate array (FPGA), or application specific interface circuit (ASIC).

The draft synchronization circuitry 206 includes hardware and software configured to support synchronization of draft messaging communications and draft messaging communications-related functionality, features, and/or services of the group-based communication system 200. In some embodiments, the draft synchronization circuitry 206 utilizes processing circuitry, such as the processor 202, to perform these actions. In some embodiments, the draft synchronization circuitry 206 sends and/or receives data from the group-based communication repository 207. In some implementations, the sent and/or received data may include draft messaging communications, draft message metadata, draft identifiers, create draft message requests, update draft message requests, post draft message requests, delete draft message requests, draft sync requests, and associated data that may be configured for association with one or more group-based communication channels. It should also be appreciated that, in some embodiments, the draft synchronization circuitry 206 includes a separate processor, specially configured field programmable gate array (FPGA), or application specific interface circuit (ASIC).

It is also noted that all or some of the information discussed herein can be based on data that is received, generated and/or maintained by one or more components of the group-based communication apparatus 210. In some embodiments, one or more external systems (such as a remote cloud computing and/or data storage system, one or more external resources 103A-103N) are also leveraged to provide at least some of the functionality discussed herein.

As described above and as will be appreciated based on this disclosure, embodiments of the present disclosure may be configured as methods, mobile devices, frontend graphical user interfaces, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

The computing systems described herein can include clients and servers. A client and server are generally remote from each other and typically interact through a communication network. The relationship of client and server arises by virtue of computer programs miming on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

The client device(s) 101 may be embodied by one or more computing systems, such as shown in FIG. 3. As illustrated in FIG. 3, the client device 101 may include a processor 302, a memory 301, an input/output circuitry 303, a communications circuitry 305, a group-based communication circuitry 304, and a draft messaging circuitry 308. As it relates to operations described in the present invention, the functioning of the processor 302, the memory 301, the input/output circuitry 303, the group-based communication circuitry 304, and the communications circuitry 305 may be similar to the similarly named components described above with respect to FIG. 2, and for the sake of brevity, additional description of the mechanics of these components is omitted. The client device 101 may further include a draft messaging circuitry 308. The draft messaging circuitry 308 includes hardware and software configured to support draft messaging-related functionality, features, and/or services of the group-based communication system 200. In some embodiments, the draft messaging circuitry 308 utilizes processing circuitry, such as the processor 302, to perform these actions. In some embodiments, the draft messaging circuitry 308 sends and/or receives data from the group-based communication system 200. In some implementations, the sent and/or received data may include draft messaging communications, draft message metadata, draft identifiers, draft messaging communications, draft message metadata, draft identifiers, create draft message requests, update draft message requests, post draft message requests, delete draft message requests, draft sync requests, and associated data that may be configured for association with one or more group-based communication channels. It should also be appreciated that, in some embodiments, the draft messaging circuitry 308 includes a separate processor, specially configured field programmable gate array (FPGA), or application specific interface circuit (ASIC). These device elements, operating together, provide the client device(s) 101 with the functionality necessary to facilitate the communication of data (e.g., draft messaging communications, draft message metadata, or the like) between a user and the group-based communication system 200.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

In various embodiments of the present disclosure, the group-based communication apparatus 210 is configured to receive, from a first client device associated with a user identifier, a create draft message request associated with a first draft messaging communication, the first draft messaging communication comprising first draft message metadata. In some embodiments, the first client device is running a group-based communication application which provides the user access to the group-based communication system. In some embodiments, the first draft message metadata comprises one or more of the user identifier, a group identifier, a draft identifier, a channel identifier, a version identifier, a thread timestamp and/or a last updated timestamp, all of which are discussed in further detail below.

The depicted group-based communication apparatus 210 is configured with one or more application programming interfaces (APIs) accessible to the client devices. For example, in some embodiments as shown in FIG. 1, the group-based communication apparatus is configured with a draft message API 250, wherein the draft message API 250 is configured to receive requests associated with draft messaging communications, including create draft message requests, update draft message requests, delete draft message requests, and draft sync requests (discussed in more detail below). In still further embodiments, the group-based communication apparatus is configured with a message API 275, wherein the message API 275 is configured to receive requests related to messaging communications such as post message requests.

In such embodiments where the group-based communication apparatus is configured with such draft message and message APIs 250, 275, the receipt of a request at one API versus the other API is a signal to the group-based communication apparatus 210 as to whether the request is associated with a draft messaging communication or a messaging communication. In such embodiments, receipt of create draft message request, update draft message request, or delete draft message request at the draft message API 250 is a flag or other indication signaling that the associated draft messaging communication is a draft message that has not yet been posted, transmitted, or otherwise sent to a group-based communication channel and is not to be posted, transmitted, or otherwise rendered to a group-based communication channel of a group based communication interface. In such embodiments, in contrast, receipt of a post message request at the message API 275 is a flag or other indication signaling that the associated draft messaging communication has not yet been posted, transmitted, or otherwise sent to a group-based communication channel and the user desires for it to be posted, transmitted, or otherwise rendered to a group-based communication channel of a group-based communication interface.

In such instances where the group-based communication apparatus 210 is configured with a draft message API 250 and/or message API 275, the draft identifier is generated and assigned by the group-based communication apparatus 210 when it receives a create draft message request via the draft message API 250. In still other embodiments, such as those where no draft message API is supported, the draft identifier is generated and assigned by the client device.

In still other embodiments, it is further contemplated that draft message metadata comprises a flag or other indication signaling that the associated draft messaging communication (or version thereof) has not previously been synchronized or otherwise transmitted to the group-based communication apparatus, due to, for example, communication or connection issues with the group-based communication system.

Returning to the create draft message request, the create draft message request can be initiated or triggered in a myriad of ways. For example, in some embodiments, the create draft message request is initiated in response to detecting user entry of a draft messaging communication in a draft message interface component. FIG. 4A depicts an example group-based communication interface 400 comprising a sidebar pane 405, a message pane 408, and a draft message interface component 415 structured in accordance with various embodiments of the invention. The depicted sidebar pane 405 includes a group-based communication channel list 410 arranged vertically as shown. The depicted group-based communication channel list 410 is arranged (e.g., alphabetically) in the sidebar pane 405 based on respective channel titles 420. The draft message interface component 415 is depicted in association with the rendering of a specific group-based communication channel, however, it is contemplated that in some embodiments, the draft message interface component 415 need not be associated with a specific group-based communication channel or any group-based communication channel at all. The draft message interface component 415 is configured for, among other things, user entry of a draft messaging communication as explained in more detail below.

In some embodiments, while the draft message interface component 415 is rendered on the group-based communication interface 400, the group-based communication apparatus 210 or the client device 101 detects user input in the draft message interface component 415 as illustrated in FIG. 4B. In still other embodiments, such user entry or detected user input in the draft message interface component 415 becomes the draft body content data of the draft messaging communication.

In other embodiments, the create draft message request is initiated in response to detecting that a draft message interface inactivity threshold has been satisfied. That is, a timer is associated with the user's last interaction or engagement with the draft message interface component (i.e., measuring an idle or inactivity time period) and once a predetermined amount of time is exceeded or satisfied, the create draft message request is initiated by the client device. In some embodiments, the draft message interface inactivity threshold is satisfied if the time difference since the user's last interaction or engagement with the draft message interface component exceeds, for example, 5 seconds, 10 seconds, 30 seconds, 1 minute, etc. In some embodiments, the user is able to adjust the draft message interface inactivity threshold and reduce and/or increase as the user desires. For example, it may be beneficial to reduce the threshold to a minimal amount of time, such as 3 seconds, so as not to risk losing any proposed revisions.

In still other embodiments, the create draft message request is initiated in response to the group-based communication application operating in a background mode as discussed in more detail below. In still other embodiments, the create draft message request is initiated once a user clicks on or otherwise selects a representative button or executable element which is configured to allow a user to indicate that the user wishes to create a draft messaging communication with the provided user input and/or information entered in a draft message interface component 415.

Once the user creates a draft messaging communication in any of the ways indicated above, the create draft message request is triggered and sent to the group-based communication apparatus 210. For example, in FIG. 4B, the user has entered "I agree with Amy but" in the depicted draft message interface component 415. The detected user input triggers a create draft message request to be sent to the group-based communication apparatus 210. Upon receipt of the create draft message request, the group-based communication apparatus 210 also is configured to cause storage of the first draft messaging communication and associated first draft message metadata in the group-based communication repository 207 and propagate the first draft messaging communication with associated first draft message metadata to all client devices 101A-101N associated with each of the user identifier and the group identifier. In some embodiments, the group-based communication apparatus 210 propagates the first draft messaging communication with associated first draft message metadata to all client devices 101A-101N associated with the user identifier. In other embodiments, the group-based communication apparatus 210 propagates the first draft messaging communication with associated first draft message metadata to only those client devices 101A-101N associated with the user identifier. In some embodiments wherein the first draft message metadata comprises a group identifier, the group-based communication apparatus 210 is further configured to propagate the first draft messaging communication with the associated first draft message metadata to all client devices associated with each of the user identifier and the group identifier. In still further embodiments wherein the first draft message metadata comprises a channel identifier (i.e., the first draft messaging communication is associated with a specific group-based communication channel), the group-based communication apparatus 210 is further configured to propagate the first draft messaging communication with the associated first draft message metadata to all client devices associated with each of the user identifier, the group identifier, and the channel identifier.

In some embodiments, when the group-based communication apparatus 210 causes storage of the first draft messaging communication and associated first draft message metadata in the group-based communication repository 207, the group-based communication apparatus 210 also is configured to associate a first parameter with the first draft message metadata. In some embodiments, the first parameter is a version identifier. The version identifier refers to one or more items of data by which a specific version of a draft messaging communication may be identified within the group-based communication system. In some embodiments, the version identifiers are used to distinguish different versions of draft messages when subjected to update draft message validation rules, described in more detail below.

In some embodiments, version identifiers indicate when the draft message was last updated. In one embodiment, the version identifier includes a timestamp associated with the receipt of the draft messaging communication by the group-based communication apparatus 210. In other embodiments, the version identifier is not a timestamp, but otherwise generated by the group-based communication apparatus 210 to identify the specific version of the draft messaging communication. That is, the version identifier is generated, assigned, and applied by the group-based communication apparatus 210 when the associated draft message metadata is stored in the group-based communication repository 207. In other embodiments, the version identifier includes a timestamp or some other identifier associated with the creation or editing of a draft messaging communication and is assigned and applied by the associated client device 101.

In still further embodiments, it is contemplated that the group-based communication system 200 (and the group-based communication apparatus 210) is capable of supporting collaborative editing of draft messaging communications. That is, in some embodiments, it is beneficial to have multiple users creating, editing, and revising a draft messaging communication. For example, in an instance of an important announcement to be posted to a company's main marketing channel, the comments and efforts of multiple users may be needed to create and finalize a draft messaging communication. In such embodiments, the group-based communication apparatus 210 would be configured to receive and cause storage of multiple user identifiers associated with the editing of a draft messaging communication. In some embodiments, the version identifier would be used to distinguish the various versions and drafts. In such embodiments, the version identifier comprises storing a revision (i.e., a list of changes to the previous version) and a revision number. The combination of the user identifier(s), version identifier, and in some instances, the draft identifier, supports the collaborative editing of a draft messaging communication. In such embodiments, the group-based communication apparatus 210 receives updates/revisions/edits from a client device 101 associated with any one of the multiple user identifiers, and would propagate the updated draft messaging communication (including revisions thereto) to client devices 101 associated with any one of the user identifiers.

In still further embodiments, the group-based communication apparatus 210 is configured to receive other types of draft message requests associated with draft messaging communications. For example, in some embodiments, the group-based communication apparatus 210 is configured to receive an update draft message request from a client device 101 associated with the user identifier. In some embodiments, the client device 101 is the first client device that generated the create draft message request. In other embodiments, the client device 101 is a second client device or any other client device of the plurality of client devices 101 associated with the user identifier. For example, in one embodiment, the group-based communication apparatus 210 is configured to receive an update draft message request from a second client device associated with the user identifier, the update draft message request is associated with a second draft messaging communication. In some embodiments, the second draft messaging communication comprises second draft message metadata. In some embodiments, the second draft message metadata comprises the user identifier. In still further embodiments, the second draft message metadata comprises the user identifier, the group identifier, and the draft identifier associated with the first draft message metadata. That is, the first and second draft messaging communications originate from the same draft message. Similar to the create draft message request, the update draft message request is initiated in a myriad of ways. For example, in one embodiment, the update draft message request is initiated in response to detecting user input in the draft message interface component rendered on the second client device, the second draft body content data comprising the detected user input. In still other embodiments, the update draft message request is initiated in response to detecting that the group-based communication application is operating in a background mode on a client device 101.

Returning to the group-based communication apparatus 210, in still further embodiments, the group-based communication apparatus 210 is configured to determine whether the second draft messaging communication satisfies update draft message validation rules. In some embodiments, the update draft message validation rules define the steps to determine whether a draft messaging communication is a valid updated draft message. In some embodiments, the update draft message validation rules require determining whether the specified draft identifier exists for the querying user. In some embodiments, the update draft message validation rules require determining whether parameters associated with two draft message metadata, such as version identifiers, are equal to or differ from each other. In some embodiments, the first draft message metadata and the second draft message metadata comprise the same version identifier, indicating that the first and second draft messaging communications are based on the same version of a draft message. In other embodiments, the first draft message metadata and the second draft message metadata comprise different version identifiers, indicating that although the first and second draft messaging communications originate from the same draft message, the first and second draft messaging communications are not based on the same version of a draft message. As explained above, in some embodiments, the first and second version identifiers are indicative of when the first and second draft messaging communications were last updated. In still further embodiments, the version identifiers comprise timestamp data indicative of when the first and second draft messaging communications were last updated by the group-based communication apparatus 210.

In further embodiments, the group-based communication apparatus 210 is configured to, in an instance where the second draft messaging communication satisfies the update draft message validation rules, propagate the second draft messaging communication with the associated second draft message metadata to all client devices associated with the user identifier, and cause storage of the second draft messaging communication with the associated second draft message metadata in the group-based communication repository 207. For example, the second draft messaging communication satisfies the update draft message validation rules in an exemplary embodiment wherein the group-based communication apparatus 210 determines that certain parameters (i.e., first and second parameters) associated with each of the first draft message metadata and the second draft message metadata do not differ (i.e., are equal to each other or are otherwise validated). In some embodiments, the second draft messaging communication satisfies the update draft message validation rules wherein the group-based communication apparatus 210 determines that version identifiers associated with each of the first draft message metadata and the second draft message metadata do not differ.

In another embodiment, the second draft messaging communication satisfies the update draft message validation rules wherein the group-based communication apparatus 210 determines that channel identifiers associated with each of the first draft message metadata and the second draft message metadata do not differ. In further embodiments, the second draft messaging communication satisfies the update draft message validation rules wherein the group-based communication apparatus 210 determines that thread identifiers associated with each of the first draft message metadata and the second draft message metadata do not differ. In still further embodiments, the second draft messaging communication satisfies the update draft message validation rules wherein the group-based communication apparatus 210 determines that thread timestamps associated with each of the first draft message metadata and the second draft message metadata do not differ. In further embodiments, the second draft messaging communication satisfies the update draft message validation rules wherein the group-based communication apparatus 210 determines that the draft identifiers associated with each of the first draft message metadata and the second draft message metadata do not differ. In various embodiments, the above referenced example draft message validation rules may be applied singularly or in some selected combination in order to validate a received draft message and its associated draft message metadata against draft message metadata stored to the group-based communication repository 207.

In some embodiments, the propagating and storing of the second draft messaging communication (with the associated second draft message metadata) is triggered once the group-based communication apparatus 210 determines that the second draft messaging communication satisfies the draft message validation rules. In some embodiments, the group-based communication apparatus 210 assigns and applies a new and/or updated version identifier to the second draft message metadata when it causes storage of the second draft messaging communication with the associated second draft message metadata in the group-based communication repository 207. For example, in some embodiments, the version identifier is associated with a timestamp associated with the time of storage of the second draft messaging communication. In some embodiments, the storage of the second draft messaging communication and the second draft message metadata overwrites the first draft messaging communication and the first draft message metadata in the group-based communication repository 207.

In some embodiments, the group-based communication apparatus 210 propagates the second draft messaging communication to all client devices 101A-101N associated with the user identifier. In other embodiments, the information is propagated to only those client devices 101A-101N associated with each of the user identifier and the group identifier. In some embodiments wherein the second draft message metadata comprises a channel identifier (i.e., the second draft messaging communication is associated with a specific group-based communication channel), the group-based communication apparatus 210 is further configured to propagate the second draft messaging communication with the associated second draft message metadata to all client devices associated with each of the user identifier, the group identifier, and the channel identifier.

Returning to the determination of whether the second draft messaging communication satisfies the update draft message validation rules, the group-based communication apparatus 210 is configured to, in an instance where the second draft messaging communication does not satisfy the update draft message validation rules, initiate a draft message conflict resolution procedure. For example, the second draft messaging communication does not satisfy (i.e., fails and is thus not a valid update draft messaging communication) the update draft message validation rules in an exemplary embodiment wherein the group-based communication apparatus 210 determines that certain parameters (i.e., first and second parameters, respectively) associated with each of the first draft message metadata and the second draft message metadata differ. In some embodiments, the second draft messaging communication does not satisfy the update draft message validation rules wherein it is determined that version identifiers associated with each of the first draft message metadata and the second draft message metadata differ. For example, differing version identifiers indicates in some embodiments that although the first and second draft messaging communications originate from the same draft message, the first and second draft messaging communications are not based on the same version of a draft message.

The draft message conflict resolution procedure is a set of procedures to address a conflict, such as when the group-based communication apparatus 210 receives an update draft message request from a client device 101 wherein a user is not updating the most recent version of a draft message as compared to the version stored in the group-based communication repository 207. That is, a possibility exists that updated draft messages occurred while the remote computing platform (e.g., group-based communication platform) was not in communication connection with the client device, and thus, the particular client device does not have the most-current version of the draft message stored locally before the user further instituted edits to the draft message.

In some embodiments, the draft message conflict resolution procedure requires disregarding the conflict and overwriting the first draft messaging communication previously stored in the group-based communication apparatus 210 with the updated second draft messaging communication as received from the client device 101. In other embodiments, the draft message conflict resolution procedure stores both versions of the draft messaging communication, i.e., the first draft messaging communication and the second draft messaging communication. Such storage of both draft messaging communications allows for more extensive conflict resolution by the group-based communication apparatus 210, the client device 101, and/or the user. In still further embodiments, the draft message conflict resolution procedure transmits an error event to the associated client device (i.e., the second client device) notifying the user of such conflict. In other embodiments, the draft message conflict resolution procedure requires programmatically generating a proposed draft messaging communication. In some embodiments, the proposed draft messaging communication comprises body content data from both of the conflicting draft messaging communication. In still further embodiments, the draft message conflict resolution requires providing an indication of one or more difference between the conflicting body content data.

Put in the context of the above described features of the group-based communication apparatus, an exemplary and non-limiting example is herein discussed to provide further clarity, which consists of a circumstance where a user begins drafting a message in the draft message interface component 415 of a first client device 101A and the first client device 101A detects the user input. Upon detecting the user input, the first client device 101A generates a create draft message request that is transmitted to the group-based communication apparatus 210. Upon receipt of the create draft message request, the draft messaging communication, and the associated metadata, the group-based communication apparatus 210 assigns a draft identifier and version identifier (e.g. Version 1) to the draft messaging communication as it causes storage of the draft messaging communication and associated metadata in a group-based communication repository 207 and propagates the first draft messaging communication to all client devices associated with the user identifier.

Further to this exemplary and non-limiting example, the user modifies or edits the same draft messaging communication (e.g., Version 1) on the first client device 101A. Upon detecting the user input, the first client device 101A generates an update draft message request that is transmitted to the group-based communication apparatus 210. Upon receipt of the update draft message request, the draft messaging communication, and the associated metadata, the group-based communication apparatus 210 determines whether the received draft messaging communication satisfies the update draft message validation rules. In this example, the draft identifier and the version identifier are the same as compared to the version of the draft messaging communication previously stored in the group-based communication repository 207. Thus, in this example, even though some identifiers in the metadata may be different (i.e, the draft message body content, the receipt timestamp from the first client device, etc.), the update draft message validation rules are satisfied because the draft identifier exists in the group-based communication repository and the version identifiers are the same. Because the received draft messaging communication satisfies the update draft message validation rules, the group-based communication apparatus 210 assigns a new version identifier (e.g., Version 2) to the updated draft messaging communication, causes storage of the updated draft messaging communication and associated metadata in the group-based communication repository 207 and propagates the updated draft messaging communication (with its associated new version identifier) to all client devices associated with the user identifier.

Further to this exemplary and non-limiting example, the user modifies or edits the same draft messaging communication (e.g., Version 2) on a second client device 101B. Upon detecting the user input, the second client device 101B generates an update draft message request that is transmitted to the group-based communication apparatus 210. Upon receipt of the update draft message request, the draft messaging communication, and the associated metadata, the group-based communication apparatus 210 determines whether the received draft messaging communication satisfies the update draft message validation rules. In this example, the draft identifier and the version identifier are the same as compared to the version of the draft messaging communication previously stored in the group-based communication repository 207. Because the received draft messaging communication satisfies the update draft message validation rules, the group-based communication apparatus 210 assigns a new version identifier (e.g., Version 3) to the updated draft messaging communication, causes storage of the updated draft messaging communication and associated metadata in the group-based communication repository and propagates the updated draft messaging communication (with its associated new version identifier) to all client devices associated with the user identifier.

Further to this exemplary and non-limiting example, the user again modifies or edits the same draft messaging communication (e.g., same draft identifier) on the first client device 101A, however, in this non-limiting example, the first client device 101A temporarily lost communication connection with the group-based communication apparatus 210 and had not yet received the updated version (e.g., Version 3) that was propagated by the group-based communication 210. Thus, in this non-limiting example, the user is modifying an outdated version of the draft messaging communication (e.g., Version 2). Upon detecting the user input, the first client device 101A generates an update draft message request that is transmitted to the group-based communication apparatus 210. Upon receipt of the update draft message request, the draft messaging communication, and the associated metadata, the group-based communication apparatus 210 determines whether the received draft messaging communication satisfies the update draft message validation rules. In this example, although the draft identifier is the same compared to the version of the draft messaging communication previously stored in the group-based communication repository 207, the version identifier is different. That is, in this exemplary and non-limiting scenario, the version identifier associated with the draft messaging communication most recently stored in the group-based communication repository 207 is Version 3, however, the version identifier associated with the modified draft messaging communication received from the first client device 101A is Version 2. Because the received draft messaging communication fails to satisfy the update draft message validation rules, the group-based communication apparatus 210 initiates the draft message conflict resolution procedure.

Returning to the group-based communication apparatus 210, in still further embodiments, the group-based communication apparatus 210 is configured to receive other types of requests associated with draft messaging communication. For example, in some embodiments, the group-based communication apparatus 210 is configured to receive a post message request. That is, once the user has completed drafting and/or editing a draft messaging communication (i.e., the first draft messaging communication, the second draft messaging communication, or any draft messaging communication), the user may indicate the user's desire to post the draft message to the feed of a group-based communication channel. In some embodiments, a representative button or executable element is configured to allow a user to indicate that the user wishes to post a draft messaging communication, with the provided user input and/or information entered in a draft message interface component 415, to a specific group-based communication channel. In other embodiments, the user can cause the client device to generate a post message request simply by pressing a button or key (e.g., pressing "enter" on a physical keyboard or keyboard displayed on a client device), or otherwise interacting with an input device associated with the client device to indicate the user's desire to post the draft message as a message. A post message request is initiated once a user clicks on, engages, touches, or otherwise selects the representative button or executable element. The post message request is associated with the draft identifier of the selected draft messaging communication and a channel identifier associated with a selected group-based communication channel. The channel identifier is associated with a group-based communication interface associated with the group identifier. In some embodiments, the group-based communication apparatus is configured with a message application programming interface (API) 275, wherein the message API 275 is configured to receive such requests associated with messaging communications. Thus, the post message request is sent to and received via the message API 275.

In response to receipt of the post message request, the group-based communication apparatus 210 is configured to generate a messaging communication based on the draft messaging communication and cause rendering of the messaging communication to the group-based communication channel. In addition to posting the messaging communication to the channel, the group-based communication apparatus 210 is further configured to delete all draft messaging communications associated with the draft identifier stored in the group-based communication repository 207 and propagate a delete draft message event associated with the draft identifier to all client devices associated with the user identifier. In some instances, the delete draft message event is propagated only to those client devices associated with each of the user identifier and the group identifier. That is, once a messaging communication is generated from a draft messaging communication, any draft messaging communications associated with the draft identifier are removed from the group-based communication repository and client devices are instructed to remove local copies of any draft messaging communications associated with the draft identifier.

In still further embodiments, the group-based communication apparatus 210 is configured to receive a delete draft message request associated with the draft identifier. That is, the user may indicate the user's desire to delete a draft messaging communication. In some embodiments, a representative button or executable element is configured to allow a user to indicate that the user wishes to delete a draft messaging communication. A delete draft message request is initiated once a user clicks on, engages, touches, or otherwise selects the representative button or executable element. In other embodiments, the delete draft message request may be initiated or triggered by a user deleting any user input and/or information previously entered in a draft message interface component 415. In some embodiments, the group-based communication apparatus 210 is configured with a draft message application programming interface (API) 250, wherein the draft message API 250 is configured to receive such requests associated with messaging communications. Thus, the delete draft message request is sent to and received via the draft message API 250.

In some embodiments, in response to receipt of a delete draft message request, the group-based communication apparatus 210 is configured to query the group-based communication repository for all draft messaging communication associated with the draft identifier and delete all draft messaging communications associated with the draft identifier stored in the group-based communication repository returned by the query. In some embodiments, the group-based communication apparatus 210 is further configured to propagate a delete draft message event associated with the draft identifier to all client devices associated with the user identifier. In other embodiments, the delete draft message event is propagated to only those client devices associated with the user identifier and the group identifier. In such embodiments, the delete draft message event directs the client devices to also delete all draft messaging communications associated with the draft identifier that are stored locally by the client devices.

In still further embodiments, the group-based communication apparatus 210 is configured to receive, from a client device, a draft sync request associated with a user identifier and a group identifier. That is, the user and/or the client device may initiate a draft sync request to indicate that an update or synchronization of draft messaging communications with the group-based communication apparatus 210 is desired. In some embodiments, a representative button, executable element, or other draft sync actuator button that forms part of the group-based communication interface is configured to allow a user to indicate that the user wishes to synchronize locally stored draft messaging communications with draft messaging communications that may be stored in the group-based communication repository 207.

A draft sync request is initiated once a user clicks on, engages, touches, or otherwise selects the representative button or executable element. In other embodiments, the draft sync request may be initiated or triggered automatically upon startup, initialization of, user login, or otherwise access to the group-based communication system by the client device. For example, in some embodiments, when the user starts, opens, logs into, or otherwise accesses a dedicated software application or a web browser running on the client device which provides access the user to the group-based communication system, the client device generates the draft sync request. In other embodiments, when the communication connection between a client device and the group-based communication platform is disrupted, the client device will generate the draft sync request when the communication connection is reconnected. In still further embodiments, the draft sync request may be initiated or triggered periodically (i.e., every second, every 2 seconds, every 2 minutes, every 5 minutes, etc.) by the client device as the software application of the group-based communication system is running on the client device. In some embodiments, the group-based communication apparatus is configured with a draft message API 250, wherein the draft message API 250 is configured to receive such requests associated with draft messaging communications. Thus, the draft sync request is sent to and received via the draft message API 250.

In some embodiments, receipt of a draft sync request causes the group-based communication apparatus 210 to query a group-based communication repository 207 for all draft messaging communications associated with each of the user identifier and the group identifier. In those where any draft messaging communications are returned by the query, the group-based communication apparatus transmits all such returned draft messaging communications with associated draft message metadata to the selected client device. In some embodiments, the query is configured to locate and return all draft messaging communications associated with the user identifier and the group identifier, regardless of size, last update time, etc. In other embodiments, the draft sync request further comprises a client last updated timestamp associated with the client device. The client last updated timestamp signifies the time at which draft messaging communications stored to the local storage of a client device were last synced with the group-based communication repository 207. In some embodiments, the client last updated timestamp serves as an initial starting point in time for querying the group-based communication repository for draft messaging communications that have been created, updated, deleted, or otherwise revised since the client last updated timestamp. Thus, in some embodiments, the resulting query locates only those draft messaging communications associated with each of the user identifier and the group identifier that have a last updated timestamp subsequent to the client last updated timestamp.

In still further embodiments, a group-based communication apparatus 210 is configured to provide indication to a user of the existence of draft messaging communications. That is, in some embodiments the group-based communication apparatus 210 is configured to receive a user identifier and a group identifier and access a plurality of group-based communication channel identifiers based on the user identifier and the group identifier. The group-based communication apparatus 210 is further configured to update the group-based communication interface 400 and cause rendering of a group-based communication channel list 410 of permitted group-based communication channel(s) to a sidebar pane 405 of the group-based communication interface 400 based on the group-based communication channel identifiers. In some embodiments, the group-based communication apparatus 210 is further configured to query a group-based communication repository 207 for all draft messaging communications associated with both the user identifier and the group identifier. In those embodiments where the query returns at least one draft messaging communication, the group-based communication apparatus 210 causes rendering of a draft list icon 430 to the sidebar pane 405 as illustrated in FIG. 4C. That is, a draft list icon 430 is rendered in association with each group-based communication channel that has an associated draft messaging communication, signaling to the user that a draft messaging communication exists. The draft list icon 430 can be any picture, symbol, image, icon, depiction, or other representation to indicate to the user that a draft messaging communication exists. For example, in some embodiments, as illustrated in FIG. 4C, the draft list icon 430 is a pencil icon.

Example Operations Performed by the Apparatuses

Having described the group-based communication apparatus, client device(s), and exemplary circuitry comprising embodiments of the present disclosure, it should be understood that the group-based communication apparatus 210 may proceed to manage draft messaging communications of a group-based communication system in a number of ways. FIG. 5A broadly illustrates a flowchart containing a series of operations or process blocks performed to manage draft messaging communications in a group-based communication system in accordance with example embodiments described herein. The operations illustrated in FIG. 5A may, for example, be performed with the assistance of, and/or under the control of group-based communication apparatus 210.

The depicted process begins at Block 502 where the group-based communication apparatus 210 is configured to receive a create draft message request. For example, such means for receiving a create draft message request may include the processor 201, draft synchronization circuitry 206, or the like. As described above, the create draft message request is received from a first client device associated with a user identifier. The create draft message request has associated therewith, a first draft messaging communication comprising first draft message metadata. As described above, in some embodiments, the first draft message metadata may comprise any one or more of a user identifier, a group identifier, a draft identifier, a channel identifier, a thread timestamp, a version identifier, draft body content data, and/or the like.

In Block 504, the group-based communication apparatus 210 is configured to cause storage of the first draft messaging communication with the associated first draft message metadata in the group-based communication repository 207. For example, such means for causing storage of the first draft messaging communication may include the processor 201, draft synchronization circuitry 206, or the like. Turning to Block 506, the group-based communication apparatus 210 further includes means, such as processor 201, draft synchronization circuitry 206, communications circuitry 205, or the like, for propagating the first draft messaging communication with the associated first draft message metadata to all client devices 101 associated with the user identifier. In some embodiments, the first draft messaging communication is propagated to only those client devices 101 associated with each of the user identifier and a group identifier.

In some embodiments, a user may wish to update, edit, and/or revise the first draft messaging communication. As discussed in detail above with respect to the Example Apparatuses, with draft message synchronization, a user may access the first draft messaging communication from any client device (i.e., first client device, second client device, etc.) associated with the user identifier, thereby generating an update draft message request. In Block 508, the group-based communication apparatus 210 receives the update draft message request from a second client device associated with the user identifier. As explained in more detail above, the update draft message request is associated with a second draft messaging communication, which comprises second draft message metadata. In some embodiments, the second draft message metadata comprises one or more of the user identifier, the group identifier, a draft identifier, a channel identifier, a thread timestamp, a version identifier, and/or the like.

In Block 510, the group-based communication apparatus 210 includes means, such as processor 201, draft synchronization circuitry 206, or the like, for determining whether the second draft messaging communication satisfies update draft message validation rules. As explained in more detail above, in some embodiments, the update draft message validation rules define the steps to determine whether a draft messaging communication is a valid updated draft message. In some embodiments, the rules require determining whether the specified draft identifier exists for the querying user. In still further embodiments, the rules require determining whether parameters associated with two draft message metadata, such as version identifiers, are equal to each other. A second draft messaging communication satisfies the update draft message validation rules if the specified draft identifier exists in the group-based communication repository 207 for the querying user and if the compared parameters are equal to each other (or are otherwise validated based on data stored to the group-based communication repository). For example, in some embodiments, the update draft message validation rules require comparing the last updated timestamp parameter of the second draft messaging communication to the last updated timestamp of the previously stored draft messaging communication.

In circumstances when the second draft messaging communication satisfies the update draft message validation rules, in Block 512, the group-based communication apparatus 210 propagates the second draft messaging communication with the associated second draft message metadata to all client devices associated with the user identifier and causes storage of the second draft messaging communication with associated second draft message metadata in the group-based communication repository 207. In some embodiments, the means for propagating and causing storage of the second draft messaging communication includes processor 201, draft synchronization circuitry 206, group-based communications circuitry 204 and/or the like.

In circumstances when the second draft messaging communication does not satisfy the update draft message validation rules, in Block 514, the group-based communication apparatus 210 initiates a draft message conflict resolution procedure. For example, in some instances, the particular client device does not have the most-current version of the draft message stored locally before the user further instituted edits to the draft message. In some embodiments, the draft message conflict resolution procedure requires disregarding the conflict and overwriting the stored draft messaging communication with the updated draft message as received from the client device. In other embodiments, the draft message conflict resolution procedure stores both versions of the draft messaging communication. In still other embodiments, the draft message conflict resolution procedure transmits an error event to the associated client device notifying the user of such conflict.

Although not shown in FIG. 5A, the group-based communication apparatus is further configured to, in some embodiments, receive a post message request associated with the draft identifier, generate a messaging communication based on the draft messaging communication, cause rendering of the messaging communication to the group-based communication channel of the group-based communication interface, delete all draft messaging communications associated with the draft identifier stored in the group-based communication repository 207 and propagate a delete draft message event associated with the draft identifier to all client devices associated with at least the user identifier. The group-based communication apparatus is also configured to, in some embodiments, receive a delete draft message request associated with a channel identifier and the draft identifier, query the group-based communication repository 207 for and delete all draft messaging communications associated with the draft identifier returned by the query, and propagate a delete draft message event associated with the draft identifier to all client devices associated with the user identifier. In some embodiments, the delete draft message event is propagated to only those client devices 101 associated with each of the user identifier and the group identifier. For example, in some embodiments, to reduce data traffic and latency, it is beneficial to propagate only those client devices associated with the user identifier and the group identifier.

FIG. 5B is a signal diagram of an example data flow represented by method 500. That is, FIG. 5B illustrates an example signal diagram illustrating data flow interactions between a group-based communication apparatus, a group-based communication repository, and one or more client devices when creating, updating, and synchronizing a draft messaging communication in accordance with one embodiment. Method 500 is described as being performed by a first client device 101A, a second client device 101B, a group-based communication apparatus 210, and a group-based communication repository 207. These may be similar to those previously discussed with regards to FIG. 1.

Turning to the client device, according to various embodiments, the individual client devices 101A-101N generate various draft message requests (i.e., create, update, delete, post, sync, etc.) to be transmitted to the group-based communication system 200. The client devices 101A-101N rely on the detection of certain defined trigger events for determining when and which request should be transmitted from the individual client devices 101A-101N to the group-based communication system 200. That is, the client devices 101A-101N provide data to the group-based communication system 200 in the form of draft message requests to reflect the determined need of the client devices 101A-101N for the associated draft messaging communication(s).

FIG. 6 illustrates various steps performed by an example client device 101 for managing draft message communications in connection with a group-based communication system 200. As shown in Block 602, the client device 101 monitors user interactions with the client device 101 to detect whether one or more create draft message trigger events has occurred, as indicated in Block 604.

The create draft message trigger event may be any of a variety of events indicating that a draft message has been created and that a create draft message request should be generated and transmitted to the group-based communication system 200. For example, in some embodiments, the create draft message trigger event may be detecting user entry of a draft messaging communication in a draft message interface component. As another example, a create draft message trigger event may be detecting that a draft message interface inactivity threshold has been satisfied. That is, a timer is associated with the user's last interaction or engagement with the draft message interface component (i.e., measuring an idle or inactivity time period) and once a predetermined amount of time is exceeded or satisfied, the create draft message request is initiated by the client device. In some embodiments, the draft message interface inactivity threshold is satisfied if the time difference since the user's last interaction or engagement with the draft message interface component exceeds, for example, 1 second, 2 seconds, 5 seconds, 10 seconds, 30 seconds, 1 minute, etc. In some embodiments, the user is able to adjust the draft message interface inactivity threshold and reduce and/or increase as the user desires. For example, it may be beneficial to reduce the threshold to a minimal amount of time, such as 1 second, so as not to risk losing any proposed revisions. However, in other embodiments, such as when the client device is a mobile device, the draft message interface inactivity threshold may be increased or even removed so as not to drain the client device's power source/battery.

In still other embodiments, the create draft message trigger event is detecting that the draft message interface component is unfocused (i.e. operating in a background mode). For example, an exemplary and non-limiting embodiment is herein discussed to provide further clarity, which consists of a circumstance where the draft message interface component 415 is placed in or operates in a background mode due to another event, component, or interface of the group-based communication interface being pushed to the foreground or active mode. In an instance where a user has entered user input in the draft message interface component 415, but prior to posting or otherwise sending the draft messaging communication to a group-based communication channel, the user receives and clicks on, activates, or otherwise selects a notification of a messaging communication posted by another user. Although the draft message interface component 415 is still visible to the user on a user interface of a client device, the draft message interface component 415 is no longer operating in the foreground mode, but instead, is unfocused and operating in a background mode. That is, the user is actively interacting with the interface component configured to display the selected messaging communication posted by another user. As a result, in some embodiments, the client device detects that the draft message interface component 415 is operating in a background mode, which in turn, initiates a create draft message request associated with the user input in the draft message interface component 415.

In other embodiments, the create draft message trigger event is detecting that the group-based communication interface and/or the dedicated software application or web browser running on the client device which provides the user access to the group-based communication system 210 is pushed to the background mode, as opposed to a foreground mode, on the client device. Similar to the exemplary embodiment described above, the user may have entered user input in the draft message interface component 415, but prior to posting or otherwise sending the draft messaging communication to a group-based communication channel, the user may receive and click on, activate, or otherwise select a notification from a different software application or the like on the client device 101. As a result, the entire group-based communication interface/dedicated software application/web browser is still actively running on the client device, however, the user may be actively interacting with another interface, software application, web browser, or the like operating in the foreground of the client device 101. As a result, in some embodiments, the client device detects that the group-based communication interface/dedicated software application/web browser is operating in a background mode, which in turn, initiates a create draft message request associated with the user input in the draft message interface component 415.

In still other embodiments, the create draft message trigger event is detecting a user clicking on or otherwise selecting a representative button or executable element which is configured to allow a user to indicate that the user wishes to create a draft messaging communication with the provided user input and/or information entered in a draft message interface component 415.

With reference again to FIG. 6, upon detecting a create draft message trigger event for initiating a create draft message request, the client device 101 generates such a create draft message request as indicated in Block 606. The client device 101 includes means, such as processor 301, draft messaging circuitry 308, or the like, for generating a create draft message request. In certain embodiments, the create draft message request comprises a first draft messaging communication, wherein the first draft messaging communication comprises first draft message metadata. In some embodiments, the first draft message metadata comprises one or more of first draft body content data, a user identifier, and a group identifier. In some embodiments, a draft identifier is generated and assigned by the client device when the create draft message request is generated and the first draft message metadata further comprises the draft identifier. In such embodiments, the draft identifier is transmitted to the group-based communication system 200 with the draft messaging communication. As indicated at Block 608, the client device 101 optionally, causes local storage of the first draft messaging communication (and associated first draft message metadata) in the client device's memory. In Block 610, the generated create draft message request is transmitted to the group-based communication system 200. In some embodiments, the client device 101 generates a client last updated timestamp, wherein the client last updated timestamp is associated with the last time that the local storage of the client device 101 was synchronized with the storage of draft messaging communications in the group-based communication repository 207.

Although not illustrated in FIG. 6, the client device 101 also monitors user interactions with the client device 101 to detect whether one or more update draft message trigger events has occurred. For example, in one embodiment, detecting user input in the draft message interface component rendered on the client device 101 is considered an update draft message trigger event. In still other embodiments, detecting that the group-based communication interface and/or the dedicated software application or web browser running on the client device which provides the user access to the group-based communication system 210 is pushed to the background mode (i.e., unfocused), as opposed to a foreground mode, on the client device, is considered an update draft message trigger event. The client device 101 includes means, such as processor 301, draft messaging circuitry 308, or the like, for generating an update draft message request upon detection of such a trigger event. The client device(s) 101 also includes means, such as processor 301, draft messaging circuitry 308, or the like, for generating a post message request and for receiving a delete draft message event. The client device(s) 101 includes means, such as processor 301, draft messaging circuitry 308, or the like, for generating a delete draft message request and for receiving a delete draft message event.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A group-based communication apparatus comprising:
at least one processor and at least one memory, the at least one memory having computer-coded instructions therein, wherein the computer-coded instructions are configured to, in execution with the at least one processor, cause the group-based communication apparatus to:

receive, from a client device of a plurality of client devices, a draft sync request associated with a user identifier and a group identifier, wherein the draft sync request comprises a request to update or synchronize draft messaging communications associated with the user identifier and the group identifier in a group-based communication system;

identify, via a query of a group-based communication repository, one or more draft messaging communications of all the draft messaging communications associated with the user identifier and the group identifier;

transmit, to the client device, the one or more draft messaging communications returned by the query; and receive, from the client device, a delete draft message request associated with at least one of the one or more draft messaging communications, wherein the at least one of the one or more draft messaging communications is associated with a draft identifier.

2. The group-based communication apparatus of claim 1, wherein the computer-coded instructions are further configured to cause the group-based communication apparatus to:

in response to transmitting, to the client device, the one or more draft messaging communications returned by the query, causing presentation on the client device of a draft list icon in association with each group-based communication channel that has an associated draft messaging communication of the one or more draft messaging communications.

3. The group-based communication apparatus of claim 2, wherein the draft list icon comprises at least one of a picture, a symbol, an image, an icon, or a depiction.

4. The group-based communication apparatus of claim 1, wherein the draft sync request is further associated with a client-last-updated timestamp, wherein the client-last-updated timestamp comprises a time at which local draft messaging communications stored to local storage of the client device were last synced with the group-based communication repository, and wherein each of the one or more draft messaging communications returned by the query are associated with the user identifier, the group identifier, and a later client-last-updated timestamp subsequent to the client-last-updated timestamp.

5. The group-based communication apparatus of claim 1, further comprising a draft message application programming interface (API), wherein the draft sync request is received via the draft message API.

6. The group-based communication apparatus of claim 1, wherein individual draft messaging communications of the one or more draft messaging communications comprise draft message metadata.

7. The group-based communication apparatus of claim 6, wherein the draft message metadata for an individual draft messaging communication comprises a version identifier.

8. The group-based communication apparatus of claim 1, wherein the draft sync request is generated by the client device responsive to a user interaction with a group-based communication interface presented on a display associated with the client device.

9. The group-based communication apparatus of claim 8, wherein the user interaction comprises an interaction with a draft sync actuator button presented via the group-based communication interface.

10. The group-based communication apparatus of claim 1, wherein the draft sync request is generated by the client device responsive to accessing, by the client device, the group-based communication system.

11. The group-based communication apparatus of claim 1, wherein the draft sync request is generated responsive to restoration of a communication connection between the client device and a group-based communication platform after an interruption.

12. The group-based communication apparatus of claim 1, wherein the draft sync request is represented via a temporary code that notifies the group-based communication apparatus that the draft sync request has been received.

13. A method comprising:

receiving, from a client device of a plurality of client devices, a draft sync request associated with a user identifier and a group identifier, wherein the draft sync request comprises a request to update or synchronize draft messaging communications associated with the user identifier and the group identifier;

identifying, via a query of a group-based communication repository, one or more draft messaging communications of all the draft messaging communications associated with the user identifier and the group identifier;

transmitting, to the client device, the one or more draft messaging communications returned by the query; and receiving, from the client device, a delete draft message request associated with at least one of the one or more draft messaging communications, wherein the at least one of the one or more draft messaging communications is associated with a draft identifier.

14. The method of claim 13, further comprising:

in response to transmitting, to the client device, the one or more draft messaging communications by the query, causing presentation on the client device of a draft list icon in association with each group-based communication channel that has an associated draft messaging communication.

15. The method of claim 13, wherein the draft sync request is further associated a client-last-updated timestamp, wherein the client-last-updated timestamp comprises a time at which local draft messaging communications stored to local storage of the client device were last synced with the group-based communication repository, and wherein each of the one or more draft messaging communications returned by the query are associated with the user identifier, the group identifier, and a later client-last-updated timestamp subsequent to the client-last-updated timestamp.

16. The method of claim 13, wherein the draft sync request is generated by the client device responsive to one or more of:

a user interaction with a group-based communication interface presented on a display associated with the client device;

accessing, by the client device, a group-based communication system; or restoration of a communication connection between the client device and a group-based communication platform after an interruption.

17. The method of claim 16, wherein the draft sync request is generated by the client device responsive to the user interaction, and wherein the user interaction comprises an interaction with a draft sync actuator button presented via the group-based communication interface.

18. One or more non-transitory computer-readable media storing instructions that, when executed by one or more processors, cause one or more processors to perform acts comprising:
   receiving, from a client device of a plurality of client devices, a draft sync request associated with a user identifier and a group identifier, wherein the draft sync request comprises a request to update or synchronize draft messaging communications associated with the user identifier and the group identifier in a group-based communication system;
   identifying, via a query of a group-based communication repository, one or more draft messaging communications of all the draft messaging communications associated with the user identifier and the group identifier;
   transmitting, to the client device, the one or more draft messaging communications returned by the query; and
   receiving, from the client device, a delete draft message request associated with at least one of the one or more draft messaging communications, wherein the at least one of the one or more draft messaging communications is associated with a draft identifier.

19. The one or more non-transitory computer-readable media of claim 18, the acts further comprising:
   in response to transmitting, to the client device, the one or more draft messaging communications returned by the query, causing presentation on the client device of a draft list icon in association with each group-based communication channel associated with at least one of the one or more draft messaging communications.

20. The one or more non-transitory computer-readable media of claim 18, wherein the query comprises a first query, the one or more draft messaging communications comprise one or more first draft messaging communications, and the acts further comprising:
   identifying, via a second query of the group-based communication repository, one or more second draft messaging communications associated with the draft identifier;
   deleting the one or more second draft messaging communications returned by the second query; and
   propagating a delete draft message event associated with the draft identifier to the plurality of client devices, wherein the plurality of client devices are associated with the user identifier.

* * * * *